(12) United States Patent
Takagi

(10) Patent No.: US 7,436,561 B2
(45) Date of Patent: Oct. 14, 2008

(54) HOLOGRAM LASER UNIT AND OPTICAL PICKUP APPARATUS

(75) Inventor: Terukazu Takagi, Onomichi (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 281 days.

(21) Appl. No.: 11/207,928

(22) Filed: Aug. 22, 2005

(65) Prior Publication Data

US 2006/0044638 A1  Mar. 2, 2006

(30) Foreign Application Priority Data

Aug. 30, 2004  (JP)  ............ P2004-250302

(51) Int. Cl.
*G02B 5/32* (2006.01)
(52) U.S. Cl. ............ 359/19; 359/569; 369/112.17
(58) Field of Classification Search .......... 359/15, 359/19, 569; 369/112.17, 112.19
See application file for complete search history.

(56) References Cited

U.S. PATENT DOCUMENTS 5,717,674 A  2/1998  Mori et al.

2004/0001419 A1 * 1/2004 Ariyoshi et al. ........ 369/112.04

FOREIGN PATENT DOCUMENTS

| JP | 9-73017 A | 3/1997 |
|----|-----------|--------|
| JP | 9-120568 A | 5/1997 |
| JP | 2000-76689 A | 3/2000 |
| JP | 2002-72143 A | 3/2002 |
| JP | 2002-279683 A | 9/2002 |
| JP | 2004-146006 A | 5/2004 |

* cited by examiner

*Primary Examiner*—Fayez G Assaf
(74) *Attorney, Agent, or Firm*—Birch, Stewart, Kolasch & Birch, LLP

(57) ABSTRACT

A laser light beam of a first wavelength which is polarized in a first polarizing direction, emitted from first and second semiconductor laser elements and reflected by an information recording surface of an optical recording medium, is made to be transmitted by a second polarizing hologram diffraction grating and diffracted in a direction toward a light receiving element by a first polarizing hologram diffraction grating. A laser light beam of a second wavelength which is polarized in the first polarizing direction, reflected by the information recording surface of the optical recording medium, is made to be converted so to be in a second polarizing direction by the $5\lambda/4$ plate. A laser light beam of the second wavelength which is polarized in the second polarizing direction is made to be diffracted in the direction toward the light emitting element by the second polarizing hologram diffraction grating.

20 Claims, 10 Drawing Sheets

HOLOGRAM LASER UNIT AND OPTICAL PICKUP APPARATUS

BACKGROUND OF THE INVENTION

1. Field of the Invention

The present invention relates to a hologram laser unit and an optical pickup apparatus, which are preferably used when reading information of an optical recording medium such as a CD (Compact Disk) and a DVD (Digital Versatile Disk) and recording information onto the optical recording medium.

2. Description of the Related Art

An optical pickup apparatus is used for reading and recording information from and onto an optical disk-shaped recording medium (hereinafter, simply referred to as an 'optical recording medium'). Since before, an optical recording medium called a CD (Compact Disk) family which information is read from and written in by the use of only light has been used, and at the time of reading and recording information from and onto this optical recording medium, a semiconductor laser element which emits a laser light beam of an infrared wavelength whose oscillation wavelength is 780 nm is used.

In recent years, an optical recording medium called a DVD (Digital Versatile Disk) family which information is read from and written in by the use of light and which allows recording of more information than the CD family also comes to be used in large quantities, and at the time of reading and recording information from and onto this optical recording medium, a semiconductor laser element which emits a laser light beam of an infrared wavelength whose oscillation wavelength is, for instance, 630 nm or more and less than 690 nm is used. Therefore, an optical pickup apparatus which is capable of reading and recording information from and onto both the optical recording mediums of the CD family and the DVD family is demanded, and is being developed.

In a first related art, an optical pickup apparatus is provided with two light sources which emit laser light beams of different oscillation wavelengths and one hologram element designed so that the efficiency of light use of a laser light beam of a short oscillation wavelength becomes large, and structured so as to be capable of finely playing back both an optical recording medium of relatively high recording density to be played back by the use of a laser light beam of a short wavelength, such as a DVD, and an optical recording medium of relatively low recording density to be played back by the use of a laser light beam of a long wavelength, such as a CD (refer to, for instance, Japanese Unexamined Patent Publication JP-A 9-73017 (1997)).

In a second related art, a laser module in which two semiconductor laser diodes whose oscillation wavelengths are different from each other and an optical element for condensing laser light beams emitted from the semiconductor laser diodes, respectively, onto an information recording surface of an optical recording medium are integrated in a single body, whereby reproduction and record of information from and onto plural standards of optical recording mediums is enabled (refer to, for instance, Japanese Unexamined Patent Publication JP-A 9-120568 (1997)).

In a third related art, a first semiconductor laser element which emits a laser light beam whose oscillation wavelength is 650 nm, a second semiconductor laser element which emits a laser light beam whose oscillation wavelength is 780 nm and a light receiving element are installed in a single package. A first light transmitting substrate is mounted above the package, and a three-beam diffraction grating and a hologram element for diffracting only the laser light beam emitted from the first semiconductor laser element are formed on the first light transmitting substrate. Moreover, a second light transmitting substrate is mounted above the first light transmitting substrate, and a hologram element for diffracting only the laser light beam emitted from the second semiconductor laser element is formed on the second light transmitting substrate. Light obtained when the laser light beam emitted from the first semiconductor laser element is reflected by an optical recording medium is diffracted and guided to the light receiving element by the hologram element on the second light transmitting substrate, and light obtained when the laser light beam emitted from the second semiconductor laser element is reflected by an optical recording medium is diffracted and guided to the light receiving element by the hologram element on the first light transmitting substrate (refer to, for instance, Japanese Unexamined Patent Publication JP-A 2000-76689).

In a fourth related art, an optical pickup apparatus is provided with a first hologram which has a first hologram diffraction grating formed on a surface thereof, and a second hologram which has a second hologram diffraction grating formed on a surface thereof and is mounted on the first hologram so as to cover the first hologram diffraction grating. The surface area of the first hologram on a side of the second hologram is larger than the surface area of the second hologram on a side of the first hologram.

When the second hologram is mounted on the first hologram, firstly, in a position on the surface of the first hologram which corresponds to each apex of the second hologram on the first hologram side, the second hologram is placed after an ultraviolet cure resin (abbreviated as a UV resin) is dropped, and temporarily secured by irradiating the UV resin with an ultraviolet ray after an optical adjustment. Secondly, the UV resin is applied to a portion not in contact with the second hologram of the surface of the first hologram and a lower portion of a side surface of the second hologram, and the UV resin is irradiated with the ultraviolet ray, whereby the second hologram is secured on the first hologram (refer to, for instance, Japanese Unexamined Patent Publication JP-A 2002-72143).

In a fifth related art, a first hologram substrate and a second hologram substrate are disposed in a single body. The first and second hologram substrates have a focus detecting hologram portion and a track detecting strip hologram portion. After the second hologram substrate is mounted on the first hologram substrate, and an optical axis adjustment and an offset adjustment are performed, the first hologram substrate and the second hologram substrate are adhered and secured by an adhesive to become a single body. At this moment, the adhesive is applied to portions through which a laser light beam emitted from a light source does not pass of the first and second hologram substrates and a side surface of the second hologram substrate, whereby the first hologram substrate and the second hologram substrate are adhered to become a single body (refer to, for instance, Japanese Unexamined Patent Publication JP-A 2002-279683).

In the aforementioned third to fifth related arts, two semiconductor laser elements are placed adjacent to each other in a position such that optical axes of laser light beams emitted from the respective semiconductor laser elements become nearly coincide so that the laser light beams of different oscillation wavelengths emitted from the two semiconductor laser elements, respectively, enter both first and second hologram elements. Therefore, resulting from the incidence of the laser light beams which are emitted from the respective semiconductor laser elements and reflected by the optical recording medium so as to be diffracted by the first hologram element, into a part of or whole second hologram element, unnecessary light is generated. Moreover, there arises a problem such that the amount of laser light beams which should be condensed onto an optical recording element decreases, whereby the efficiency of the use of light lowers and reliability lowers. In order to solve these problems, it is required to space the two hologram elements out so that the laser light beam diffracted by the first hologram element does not interfere in the second hologram element. In order to arrange the two hologram elements as above, there is a problem such that the optical pickup apparatus becomes large because it is required to enlarge the dimension in a thickness direction of the substrate on which the respective hologram elements are formed.

In order to solve the above-mentioned problem such that the efficiency of the use of light lowers, it is required to make the dimensions in thickness directions of diffraction grating grooves formed on the three-beam diffraction grating and the second hologram element to be dimensions such that only a laser light beam emitted from the second semiconductor laser element is diffracted, and make the dimension in a thickness direction of a diffraction grating groove formed on the first hologram element to be a dimension such that only a laser light beam emitted from the first semiconductor laser element is diffracted. However, since pitches of the diffraction gratings of the first and second hologram elements are small as compared with that of the three-beam diffraction grating, there is a problem such that it is difficult to provide the first and second hologram elements with diffraction grating grooves having dimensions such that only one of the laser light beams emitted from the two semiconductor laser elements is diffracted.

SUMMARY OF THE INVENTION

An object of the invention is to provide a hologram laser unit and an optical pickup apparatus, which are capable of reducing size and weight thereof, and increasing reliability.

The invention provides a hologram laser unit, comprising:
a light source for emitting light beams of a first wavelength and a second wavelength;
a light receiving element for receiving a light beam emitted from the light source and reflected by an information recording surface of an optical recording medium; and
a hologram coupled member having a first optical element and a second optical element, the first optical element diffracting an incident light of the first wavelength which is polarized in a first polarization direction, to a direction toward the light receiving element and transmitting an incident light which is polarized in a second polarization direction perpendicular to the first polarization direction, and the second optical element diffracting an incident light of the second wavelength which is polarized in the second polarization direction to a direction toward the light receiving element and transmitting an incident light which is polarized in the first polarization direction.

Further, in the invention, it is preferable that the hologram coupled member is structured in a lamination of a first substrate on which the first optical element is formed, and a second substrate on which the second optical element is formed, and surfaces of the first and second substrates which face each other are plane.

Further, in the invention, it is preferable that the light source is an integrated semiconductor laser unit into which a first semiconductor laser element for emitting the light beam of the first wavelength and a second semiconductor laser element for emitting the light beam of the second wavelength are integrated.

Further, in the invention, it is preferable that the first wavelength is 780 nm and the second wavelength is 650 nm.

Further, in the invention, it is preferable that the first and second optical elements are formed so that the light beam of the first wavelength passes through the first and second optical elements, and the light beam of the second wavelength passes through the first and second optical elements.

Further, in the invention, it is preferable that dimensions of the first and second optical elements are determined based on numerical apertures of lenses which guide the light beam reflected by the light recording medium to the hologram coupled member.

Further, in the invention, it is preferable that on the first substrate is formed a beam splitting diffraction grating which splits an incident light into one main beam and two sub beams.

Further, in the invention, it is preferable that the light receiving element receives the light beams of the first and second wavelengths in a common light receiving region.

The invention provides an optical pickup apparatus comprising:
the hologram laser unit mentioned above in which the light source emits a light beam polarized in the first polarization direction;
an optical system for condensing a light beam emitted from the light source of the hologram laser unit onto an information recording surface of an optical recording medium, and guiding a reflected light to the hologram laser unit; and
a polarizing element for changing the polarization direction of the light beam of the second wavelength reflected by the information recording surface of the optical recording medium and guided to the hologram laser unit by the optical system, to the second polarization direction.

Further, in the invention, it is preferable that the polarizing element is structured in a single body with the second substrate.

According to the invention, in a case of thinking of an optical unit incorporating the hologram laser unit comprising the light source, the light receiving element for receiving the light beam emitted from the light source and reflected by the optical recording medium, and the hologram coupled member having the first optical element and the second optical element; and the polarizing element for changing the polarization direction of the light beam of the second wavelength emitted from the light source and reflected by the information recording surface of the optical recording medium, from the first polarization direction to the second polarization direction, the light beam of the first wavelength emitted from the light source and reflected by the information recording surface of the optical recording medium via the hologram laser unit and the polarizing element, the light beam being polarized in the first polarization direction, is transmitted by the second optical element and enters the first optical element since the polarization direction remains as the first polarization direction even when the light beam enters the polarizing element again. And then, the light beam of the first wavelength which has entered the first optical element, the light beam being polarized in the first polarization direction, is diffracted in the direction toward the light receiving element.

Further, in the optical unit, the light beam of the second wavelength emitted from the light source and reflected by the information recording surface of the optical recording medium via the hologram laser unit and the polarizing element, the light beam being polarized in the first polarization direction, has the polarization direction thereof changing from the first polarization direction to the second polarization direction upon entering the polarizing element again, and therefore the light beam of the second wavelength being polarized in the second polarization direction is diffracted in the direction toward the light receiving element upon entering the second optical element.

As described above, the light beams of the first and second wavelengths emitted from the light source, which have passed through the hologram laser unit and the polarizing element and then been reflected by the information recording surface of the optical recording medium, are diffracted in the direction securely toward the light receiving element and received by the light receiving element, respectively. Moreover, even when the light beam of the second wavelength reflected by the information recording surface of the optical recording medium, the light beam being polarized in the second polarization direction, enters the first optical element on the way toward the light receiving element after being diffracted by the second optical element, the first optical element has such a property of transmitting the light beam which is polarized in the second polarization direction, without diffracting the light beam, and therefore unnecessary light resulting from the incidence of the light beam diffracted by the second optical element into the first optical element, is not generated. Accordingly, the amount of the light beam which should be received by the light receiving element does not decrease unlike in the related art, and therefore the efficiency of the use of light can be enhanced compared to the related art. This makes it possible to enhance the reliability.

Further, according to the invention, the hologram coupled member is structured in a lamination of the first substrate on which the first optical element is formed, and the second substrate on which the second optical element is formed. The surfaces of the first and second substrates which faces each other are plane. Accordingly, in a case where the second substrate is laminated on the first substrate and then an optical adjustment such as an optical axis adjustment for the second optical element is executed, it is possible to easily perform on a surface of the first substrate, the surface facing the second substrate, operations such that the second substrate is caused to be moved in a horizontal direction and such that the second substrate is caused to be rotated. This makes it possible to simply execute the optical adjustment for the second optical element.

Further, according to the invention, the first semiconductor laser element for emitting the light beam of the first wavelength and the second semiconductor laser element for emitting the light beam of the second wavelength are integrated as the integrated semiconductor laser unit. This makes it possible to reduce the number of components in the hologram laser unit and furthermore, the number of steps in assembly at the time of manufacturing the hologram laser unit compared to a case where the first semiconductor laser element and the second semiconductor laser element are separately disposed without being integrated.

Further, according to the invention, the first wavelength is 780 nm. The light beam of the first wavelength of 780 nm emitted from the light source and reflected by the information recording surface of the optical recording medium, is transmitted by the second optical element and diffracted by the first optical element and then guided to the light receiving element. This makes it possible to detect a signal which is required for recording information onto a CD and playing back the information recorded on the CD. Moreover, the second wavelength is 650 nm. The light beam of the wavelength of 650 nm emitted from the light source and reflected by the information recording surface of the optical recording medium, is diffracted by the second optical element and guided to the light receiving element. This makes it possible to detect a signal which is required for recording information onto a DVD and playing back the information recorded on the DVD.

Further, according to the invention, the first and second optical elements are formed so that the light beam of the first wavelength passes through the first and second optical elements, and the light beam of the second wavelength passes through the first and second optical elements. For instance, the first and second optical elements are formed so as to have such dimensions that are longer than a variation range of incident positions due to variation of the wavelengths of the first and second semiconductor laser elements serving as the light sources. Thus, even when the variation of the wavelengths of the first and second semiconductor laser elements occurs by variation in temperature or the like, the light beams of the first and second wavelengths emitted from the first and second semiconductor laser elements and reflected by the information recording surface of the optical recording medium can be made to securely enter the first optical element, and further the light beam of the second wavelength emitted from the light source and reflected by the information recording surface of the optical recording medium can be made to securely enter the second optical element. Accordingly, the first optical element diffracts the incident light beam of the first wavelength toward the light receiving element, and the second optical element diffracts the incident light beam of the second wavelength toward the light receiving element, and therefore it is possible to obtain the signal which is required for recording information onto an optical recording medium and playing back the information recorded on the optical recording medium on the basis of the respective light beam which is received by the light receiving element.

Further, according to the invention, the dimensions of the first and second optical elements are determined based on the numerical apertures of the lenses which guide the light beam reflected by the light recording medium to the hologram coupled member. By thus determining the dimensions of the first and second optical elements based on the numerical apertures of the lenses, the dimensions of the first and second optical elements can be made minimal dimensions. This makes it possible to reduce a cost of manufacturing the first and second optical elements, and easily manufacture the first and second optical elements compared to a case where the dimensions of the first and second optical elements are relatively large. In addition, even when the first and second optical elements are formed so as to have the minimal dimensions determined as above, the light beams of the first and second wavelengths can be made to securely pass through the first and second optical elements, respectively.

Further, according to the invention, on the first substrate is formed the beam splitting diffraction grating which splits the incident light into one main beam and two sub beams. By thus forming the beam splitting diffraction grating on the first substrate on which the first optical element is formed, it is possible to reduce the number of optical components in the hologram laser unit compared to a case where the beam splitting diffraction grating is independently disposed. Moreover, in a case of using the hologram laser unit that the number of optical components is reduced, for instance, in the optical pickup apparatus, it is possible to reduce size and weight of the optical pickup apparatus, and it is possible to decrease the cost of manufacture of the optical pickup apparatus.

Further, according to the invention, the light receiving element receives the light beam of the first wavelength and the light beam of the second wavelength in the common light receiving region. Accordingly, a dimension of the light receiving element can be small compared to a case where the light receiving region for receiving the laser light beam of the first wavelength, and the light receiving region for receiving the light beam of the second wavelength are separately disposed so as to receive the light beams of the first and second wavelengths in the separately disposed light receiving regions. This makes is possible to reduce size and weight of the hologram laser unit.

Further, according to the invention, the optical system condenses the light beam emitted from the light source of the hologram laser unit onto the information recording surface of the optical recording medium, and guides the reflected light to the hologram laser unit. The polarizing element changes the polarization direction of the light beam of the second wavelength which is reflected by the information recording surface of the optical recording medium and guided to the hologram laser unit by the optical system, to the second polarization direction. The light beam of the first wavelength emitted from the light source and reflected by the information recording surface of the optical recording medium via the hologram laser unit and the polarizing element, the light beam being polarized in the first polarization direction, has the polarization direction which remains as the first polarization direction even when the light beam enters the polarizing element again. The light beam of the first wavelength is guided to the second optical element of the hologram laser unit by the optical system and transmitted by the second optical element, and then enters the first optical element. And then, the light beam of the first wavelength which has entered the first optical element, the light beam being polarized in the first polarization direction, is diffracted in the direction toward the light receiving element.

Further, the light beam of the second wavelength emitted from the light source and reflected by the information recording surface of the optical recording medium via the hologram laser unit and the polarizing element, the light beam being polarized in the first polarization direction, has the polarization direction thereof changing from the first polarization direction to the second polarization direction upon entering the polarizing element again. The light beam of the second wavelength is guided to the second optical element of the hologram laser unit by the optical system and enters the second optical element. And then, the light beam of the second wavelength which has entered the second optical element, the light beam being polarized in the second polarization direction, is diffracted in the direction toward the light receiving element.

As described above, the light beams of the first and second wavelengths emitted from the light source, which have passed through the hologram laser unit and the polarizing element and then been reflected by the information recording surface of the optical recording medium, are diffracted in the direction securely toward the light receiving element and received by the light receiving element, respectively. Moreover, even when the light beam of the second wavelength reflected by the information recording surface of the optical recording medium, the light beam being polarized in the second polarization direction, enters the first optical element on the way toward the light receiving element after being diffracted by the second optical element, the first optical element has such a property of transmitting the light beam which is polarized in the second polarization direction without diffracting the light beam, and therefore unnecessary light resulting from the incidence of the light beam diffracted by the second optical element into the first optical element, is not generated. Accordingly, the amount of the light beam which should be received by the light receiving element does not decrease unlike in the related art, and therefore the efficiency of the use of light can be enhanced compared to the related art. This makes it possible to enhance the reliability.

Further, according to the invention, the polarizing element is structured in a single body with the second substrate. By thus structuring the polarizing element and the second substrate in a single body, the number of the optical components and the number of steps in assembly at the time of manufacture are reduced, and the operation of the optical adjustment such as an optical axis adjustment is also simplified. Moreover, in a case of using the hologram laser unit comprising the hologram coupled member that the number of optical components is reduced, for instance, in the optical pickup apparatus, it is possible to reduce size and weight of the optical pickup apparatus, and it is possible to decrease the cost of manufacture of the optical pickup apparatus.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERED EMBODIMENTS

Figure 1:
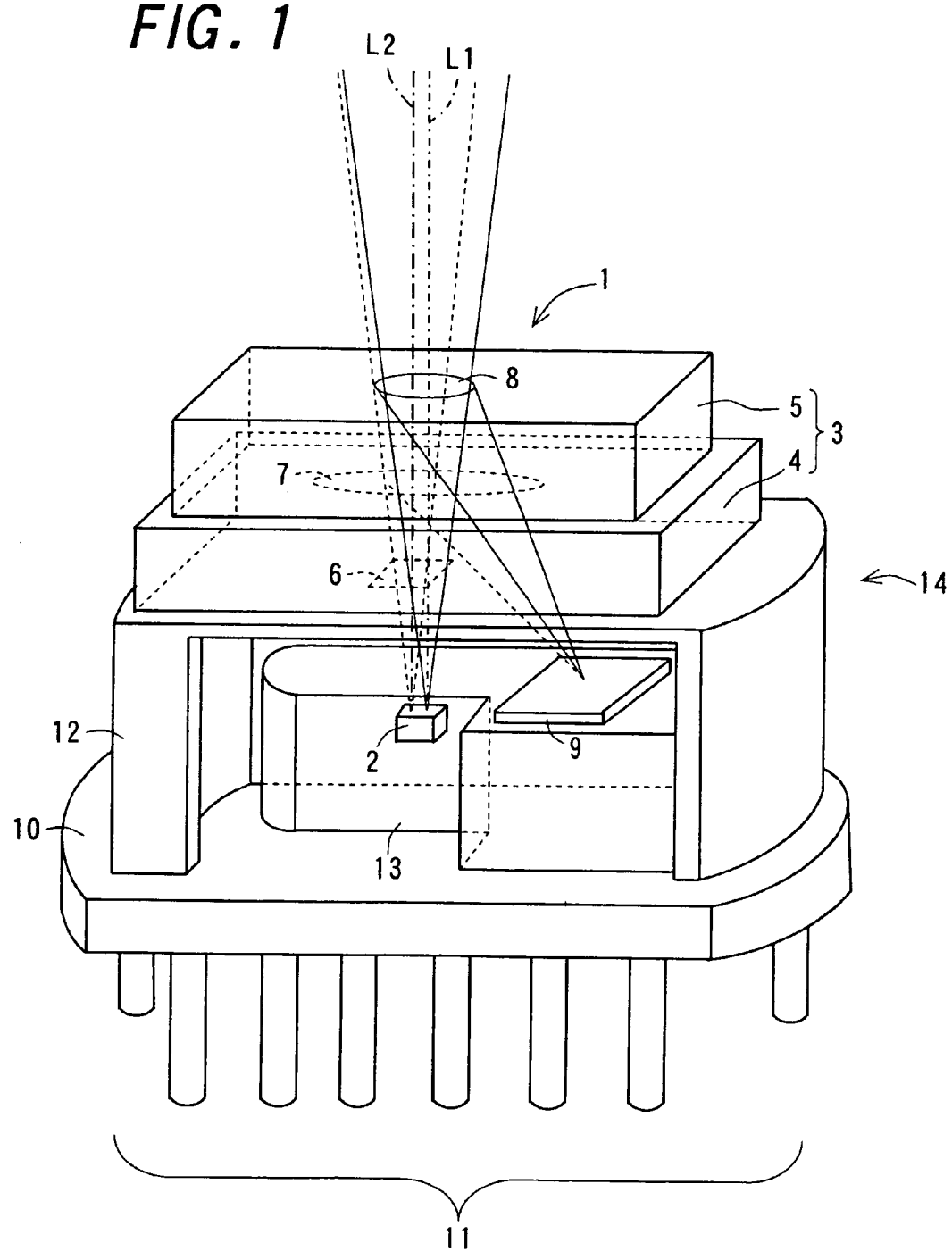
FIG. 1 is a perspective view schematically showing a structure of a hologram laser unit comprising a hologram coupled member according to a first embodiment of the invention.

Now referring to the drawings, preferred embodiments of the invention are described below.

Figure 2:
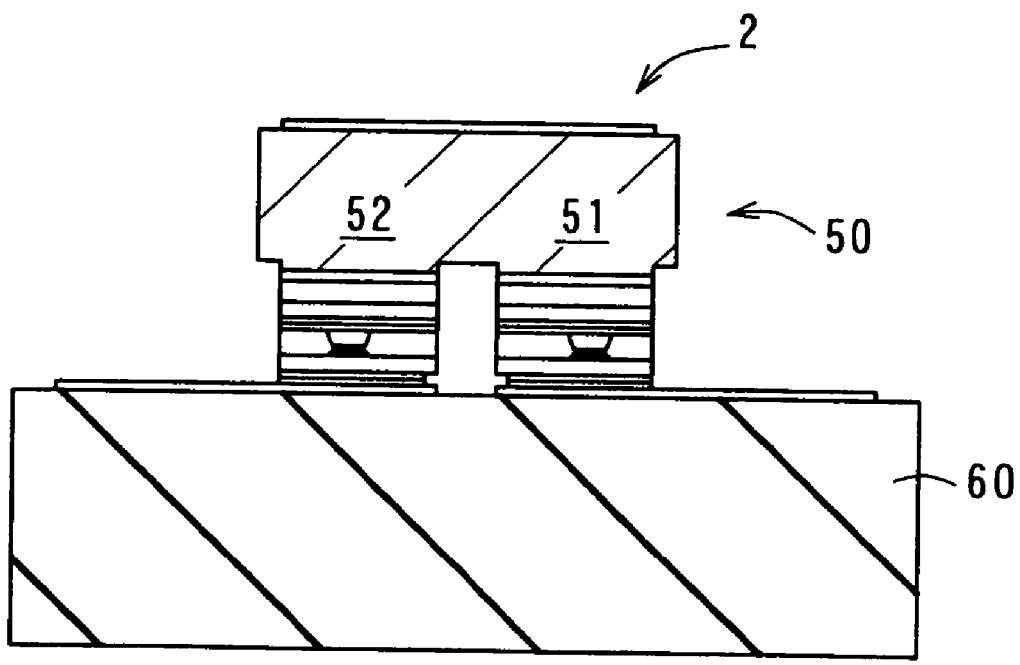
FIG. 2 is a cross sectional view showing a structure of an integrated semiconductor laser element unit.

FIG. 1 is a perspective view schematically showing a structure of a hologram laser unit 1 according to a first embodiment of the invention. FIG. 2 is a cross sectional view showing a structure of an integrated semiconductor laser element unit 2. In FIG. 1, a cap 12 described later is partially cut away to show. The hologram laser unit 1 comprises a hologram coupled member 3 and a semiconductor laser apparatus 14. The semiconductor laser apparatus 14 includes the integrated semiconductor laser element unit 2, a light receiving element 9, a stem 10, an electrode 11, a cap 12, and a heat sink 13. The hologram coupled member 3 includes a first polarizing hologram substrate 4 serving as a first substrate, and a second polarizing hologram substrate 5 serving as a second substrate. The first polarizing hologram substrate 4 includes a beam splitting diffraction grating 6 and a first polarizing hologram diffraction grating 7 serving as a first optical element, and the second polarizing hologram substrate 5 includes a second polarizing hologram diffraction grating 8 serving as a second optical element.

The integrated semiconductor laser element unit 2 serving as a light source comprises an integrated semiconductor laser element 50 and a sub mount 60 as shown in FIG. 2. The integrated semiconductor laser element unit 2 is an integrated semiconductor laser unit. The integrated semiconductor laser element 50 includes a first semiconductor laser element 51 and a second semiconductor laser element 52. The integrated semiconductor laser element 50 is mounted on the sub mount 60 which is an insulating substrate. The first semiconductor laser element 51 emits a laser light beam of an infrared wavelength whose oscillation wavelength is, for instance, 780 nm. The first semiconductor laser element 51 is used for reading information recorded on an information recording surface of a CD (Compact Disk) and recording information onto the information recording surface of the CD. The second semiconductor laser element 52 emits a laser light beam of an infrared wavelength whose oscillation wavelength is, for instance, 650 nm. The second semiconductor laser element 52 is used for reading information recorded on an information recording surface of a DVD (Digital Versatile Disk). The laser light beams emitted from the first and second semiconductor laser elements 51, 52 are both linearly polarized light beams which are polarized in a first polarization direction. An optical axis L1 of the laser light beam emitted from the first semiconductor laser element 51 and an optical axis L2 of the laser light beam emitted from the second semiconductor laser element 52 are parallel to each other. The respective semiconductor laser elements 51 and 52 of the integrated semiconductor laser element 50 are adjacent to each other in a direction perpendicular to the optical axes L1, L2. The heat sink 13 is mounted on one surface in a thickness direction of the stem 10 formed like a plate. The integrated semiconductor laser element unit 2 is mounted on one surface of the heat sink 13, which is perpendicular to the one surface in a thickness direction of the stem 10.

The beam splitting diffraction grating 6 diffracts an entering laser light beam, thereby splitting the laser light beam into a transmitting light serving as one main beam and ± first-order diffraction lights serving as two sub beams. The first polarizing hologram diffraction grating 7 is designed so as to diffract a light in the first polarization direction so that a ratio of a zero-order diffraction light and the ± first-order diffraction light is schematically 4:1. The first polarizing hologram diffraction grating 7 is designed so as to have a property that all lights in the second polarization direction are transmitted. Such a property is determined by depth and aspect ratio of a diffraction groove which is formed on the first polarizing hologram diffraction grating 7, and a combination of birefringent materials which are filled in the diffraction groove. The second polarizing hologram diffraction grating 8 is designed so that all lights in the first polarization direction are transmitted, practically so that a transmission is 95% or the like. The second polarizing hologram diffraction grating 8 is designed so as to have a property that all lights in the second polarization direction are diffracted. In the following description, a laser light beam emitted from the first and second semiconductor laser elements 51, 52 is occasionally simply referred to as a 'light' or a 'light beam'.

A light beam of the first wavelength emitted from the first semiconductor laser element 51, which has entered the first polarizing hologram diffraction grating 7, the light beam being polarized in the first polarization direction, is diffracted and then enters the second polarizing hologram diffraction grating 8. The laser light beam in the first polarization direction, which has entered the second polarizing hologram diffraction grating 8, is transmitted without being diffracted. The light beam transmitted by the second polarizing hologram diffraction grating 8, passes through a five-quarter wavelength plate (hereinafter, occasionally referred to as a '5λ/4 plate') 23 so as to be condensed onto an optical recording medium 26 and then is reflected by the optical recording medium 26 and passes through the 5λ/4 plate 23 again so as to enter the second polarizing hologram diffraction grating 8. The light which has entered the second polarizing hologram diffraction grating 8, is transmitted by the second polarizing hologram diffraction grating 8 and enters the first polarizing hologram diffraction grating 7 and then is diffracted by the first polarizing hologram diffraction grating 7 in a direction toward the light receiving element 9 described later.

Further, a light beam of the second wavelength emitted from the second semiconductor laser element, which has entered the first polarizing hologram diffraction grating 7, the light beam being polarized in the first polarization direction, is transmitted without being diffracted and then enters the second polarizing hologram diffraction grating 8. The laser light beam in the first polarization direction, which has entered the second polarizing hologram diffraction grating 8, is diffracted by the second polarizing hologram diffraction grating 8. The light beam diffracted by the second polarizing hologram diffraction grating 8, passes through the 5λ/4 plate 23 described later so as to be condensed onto the optical recording medium 26 and then is reflected by the optical recording medium 26 and passes through the 5λ/4 plate 23 again, thereby converting the polarization direction from the first polarization direction to the second polarization direction which is perpendicular to the first polarization direction. The light of the second wavelength which has passed through the 5λ/4 plate 23 and which has the polarization direction converted to the second polarization direction, enters the second polarizing hologram diffraction grating 8 and then is diffracted by the second polarizing hologram diffraction grating 8 in the direction toward the light receiving element 9 described later.

The light receiving element 9 is realized by a photodiode or the like, and converts incident light to electric signals. The light receiving element 9 is mounted on one surface in a thickness direction of the heat sink 13. The cap 12 is a sealing member for sealing the integrated semiconductor laser element unit 2 and the light receiving element 9 in order to avoid physical contact of the integrated semiconductor laser element unit 2 and the light receiving element 9 with the outside. The cap 12 is mounted on one surface in a thickness direction of the stem 10 formed like a plate. Thus, the integrated semiconductor laser element unit 2 and the light receiving element 9 are hermetically sealed by the stem 10 and the cap 12. The electrode 11 is disposed so as to protrude from another surface portion in the thickness direction of the stem 10 toward another side in the thickness direction, and electrically connected to the integrated semiconductor laser element unit 2.

The first polarizing hologram substrate 4 formed into a rectangular parallelepiped is mounted on the semiconductor laser apparatus 14. Describing in detail, the first polarizing hologram substrate 4 is mounted on one surface portion of the cap 12, the surface portion being perpendicular to the optical axes L1, L2. The beam splitting diffraction grating 6 is formed on another surface portion in a thickness direction of the first polarizing hologram substrate 4, and the first polarizing hologram diffraction grating 7 is formed on a surface portion opposite to the surface portion where the beam splitting diffraction grating 6 is formed, that is, on one surface portion in a thickness direction of the first polarizing hologram substrate 4. The second polarizing hologram substrate 5 formed into a rectangular parallelepiped is mounted on the one surface portion in the thickness direction of the first polarizing hologram substrate 4. The second polarizing hologram diffraction grating 8 is formed on a surface portion of the second polarizing hologram substrate 5, the surface portion being opposite to the surface joined to the first polarizing hologram substrate 4, that is, on one surface portion in a thickness direction of the second polarizing hologram substrate 5.

In the embodiment, the surface of the cap 12 facing the first polarizing hologram substrate 4, the surface of the first polarizing hologram substrate 4 facing the cap 12, the surface of the first polarizing hologram substrate 4 facing the second polarizing hologram substrate 5, and the surface of the second polarizing hologram substrate 5 facing the first polarizing hologram substrate 4 are plane surfaces, respectively, and are mutually parallel. Moreover, the optical axes L1, L2 of the laser light beams emitted from the first and second semiconductor laser elements 51, 52, respectively, are perpendicular to the surface of the cap 12 facing the first polarizing hologram substrate 4, the surface of the first polarizing hologram substrate 4 facing the cap 12, the surface of the first polarizing hologram substrate 4 facing the second polarizing hologram substrate 5, and the surface of the second polarizing hologram substrate 5 facing the first polarizing hologram substrate 4.

Figure 3:
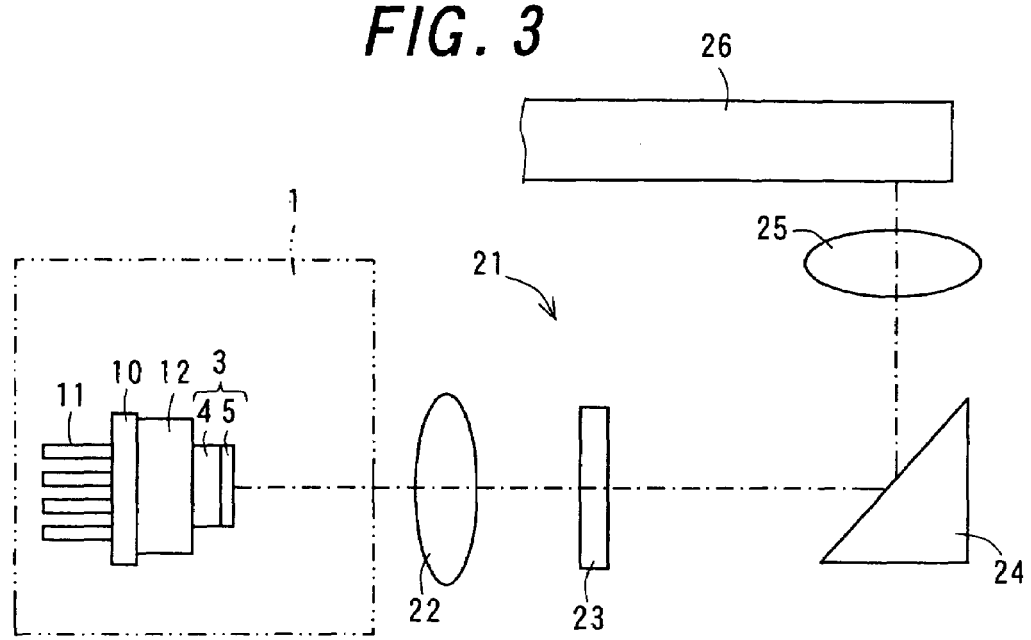
FIG. 3 is a view schematically showing a structure of an optical pickup apparatus.

FIG. 3 is a view schematically showing a structure of an optical pickup apparatus 21. The optical pickup apparatus 21 comprises the hologram laser unit 1, a collimation lens 22, a five-quarter wavelength plate 23, an erecting mirror 24 and an objective lens 25. The optical pickup apparatus 21 is an apparatus which executes at least one of processing of optically reading information recorded on the information recording surface of the optical recording medium 26 and processing of optically recording information onto the information recording surface of the optical recording medium 26. The optical recording medium 26 is, for instance, a CD, a CD-R (Compact Disk-Recordable), a CD-RW (Compact Disk-Rewritable), a DVD, a DVD-R (Digital Versatile Disk-Recordable), a DVD-RAM (Digital Versatile Disk-Random Access Memory) and the like.

A collimation lens 22 makes an incident laser light beam to a parallel light beam. The 5λ/4 plate 23 is a polarizing element which causes different phase differences respectively with respect to the two laser light beams of different wavelengths emitted from each semiconductor laser element 51, 52 of the integrated semiconductor laser element unit 2. The 5λ/4 plate 23 is realized by a light transmitting phase difference film. The 5λ/4 plate 23 is formed by, for instance, polycarbonate resin, polyvinyl alcohol resin, Arton (registered trademark) which is a heat-resistant transparent resin manufactured by JSR Co. The 5λ/4 plate 23 is placed on a light path between the second polarizing hologram substrate 5 provided with the polarizing hologram diffraction grating 8 serving as the second optical element and an objective lens 25 described later.

The 5λ/4 plate 23 is a polarizing element which gives a phase difference of almost 360 degrees to a laser light beam of the first wavelength, specifically 780 nm, emitted from the first semiconductor laser element 51, that is, a polarizing element which functions as a wavelength plate for the laser light beam emitted from the first semiconductor laser element 51. When a linearly polarized light beam from the first semiconductor laser element 51 enters the 5λ/4 plate 23, the 5λ/4 plate 23 transmits the linearly polarized light beam as it is. The laser light beam emitted from the first semiconductor laser element 51 is a linearly polarized light beam, and even when entering the 5λ/4 plate 23, the linearly polarized laser light beam is transmitted as it is. The linearly polarized laser light beam transmitted by the 5λ/4 plate 23 passes through the erecting mirror 24 described later and the objective lens 25, and is condensed onto the information recording surface of the optical recording medium 26. Even when a laser light beam reflected by the information recording surface of the optical recording medium 26 passes through the 5λ/4 plate 23 again, it remains a linearly polarized light beam whose polarization direction is the same direction as that of the linearly polarized laser light beam before entering the 5λ/4 plate 23.

Further, the 5λ/4 plate 23 is a polarizing element which gives a phase difference of almost 90 degrees to a laser light beam of the second wavelength, specifically 650 nm, emitted from the second semiconductor laser element 52, that is, a polarizing element which functions as a one-quarter wavelength plate for the laser light beam emitted from the second semiconductor laser element 52. When a linearly polarized light beam from the second semiconductor laser element 52 enters the 5λ/4 plate 23, the 5λ/4 plate 23 converts the linearly polarized light beam to a circularly polarized light beam and emits the circularly polarized light beam. When a circularly polarized light beam enters the 5λ/4 plate 23, the 5λ/4 plate 23 converts the circularly polarized light beam to a linearly polarized light beam and emits the linearly polarized light beam. The laser light beam emitted from the second semiconductor laser element 52 is a linearly polarized light beam, and when the linearly polarized laser light beam enters the 5λ/4 plate 23, it is converted to a circularly polarized laser light beam. The circularly polarized laser light beam passes through the erecting mirror 24 described later and the objective lens 25, and is condensed onto the information recording surface of the optical recording medium 26. A laser light beam reflected by the information recording surface of the optical recording medium 26 passes through the 5λ/4 plate 23 again, thereby being converted into a linearly polarized light beam whose polarization direction crosses at right angles with that of the linearly polarized laser light beam before entering the 5λ/4 plate 23.

As described above, different phase differences are caused respectively with respect to the laser light beams of the first and second wavelengths by the 5A/4 plate 23. This makes it possible to make the polarization directions of the laser light beams of the first and second wavelengths be different from each other. This enables to diffract the laser light beam whose wavelength is 780 nm, in the direction toward the light receiving element 9 in the first polarizing hologram diffraction grating 7, and diffract the laser light beam whose wavelength is 650 nm, in the direction toward the light receiving element 9 in the second polarizing hologram diffraction grating 8.

The erecting mirror 24 bends 90 degrees optical paths of the laser light beams emitted from the first and second semiconductor laser elements 51, 52, which has passed through the 5λ/4 plate 23. And then, the erecting mirror 24 guides the laser light beams to the objective lens 25. The objective lens 25 condenses the laser light beams bent by the erecting mirror 24 onto the optical recording medium 26. When a driving voltage and a driving current are supplied to the first and second semiconductor laser elements 51, 52 of the integrated semiconductor laser element unit 2 serving as light sources of the optical pickup apparatus 21 via the electrode 11 disposed on the stem 10 of the semiconductor laser apparatus 14, laser light beam is emitted from the integrated semiconductor laser element unit 2. The linearly polarized laser light beams emitted from the first and second semiconductor laser elements 51, 52 enter the beam splitting diffraction grating 6 formed on the first polarizing hologram substrate 4. The beam splitting diffraction grating 6 is disposed for using a differential phase detection (abbreviated as DPD) method in order to detect a tracking error signal (hereinafter, occasionally referred to as an 'TES') necessary for reading information of a DVD, and using a three-beam method or a differential push-pull (abbreviated as DPP) method in order to detect a TES necessary for reading information of a CD. In these TES detecting method, a main beam and a sub beam are made to be required, the main beam being parallel to the optical axes L1, L2, the sub beam being disposed on both side portions in a track direction of the main beam on the optical recording medium 26 because the optical axes L1, L2 are slightly inclined. Therefore, the incident light is caused to be diffracted by the beam splitting diffraction grating 6, and the ± first-order diffraction light is caused to be generated as the sub beam.

The beam splitting diffraction grating 6 diffracts the laser light beam emitted from the first semiconductor laser element 51 and thereby splits the laser light beam into a transmission light beam as a main beam and first-order diffraction lights as two sub beams and hardly diffracts the laser light beam emitted from the second semiconductor laser element 52. In order to form the beam splitting diffraction grating 6 described above, it is necessary to properly set the length of a diffraction grating groove formed on the beam splitting diffraction grating 6 so as to make unnecessary light generated by diffraction to be as small as possible. For instance, in the case of setting the length of the diffraction grating groove formed on the beam splitting diffraction grating 6 to 1.4 μm, for the laser light beam emitted from the first semiconductor laser element 51, the transmissivity of the main beam, that is, the transmissivity of the transmission light beam is 72%, and the diffraction efficiency of the sub beam, that is, the diffraction efficiency of the first-order diffraction light is 12%, with the result that a proper light amount ratio of three beams can be obtained. Moreover, in the case of setting the length of the diffraction grating groove to 1.4 μm, the diffraction efficiency for the laser light beam emitted from the second semiconductor laser element 52 is nearly zero, with the result that it is possible to transmit the laser light beam emitted from the second semiconductor laser element 52 while hardly diffracting. Part of the light beam, specifically about 67% of the light beam emitted from the first and second semiconductor laser elements 51, 52, which has passed through the beam splitting diffraction grating 6, is transmitted by the first polarizing hologram diffraction grating 7, and enters the second polarizing hologram diffraction grating 8. The second polarizing hologram diffraction grating 8 transmits the incident light without being diffracted so that the light enters the collimation lens 22. The light made to be a parallel light beam by the collimation lens 22 enters the 5λ/4 plate 23.

Even when the linearly polarized light beam emitted from the first semiconductor laser element 51 enters the 5λ/4 plate 23, it is transmitted as a linearly polarized light beam, and reflected by the erecting mirror 24 and then guided to the objective lens 25. The objective lens 25 condenses the light beam reflected by the erecting mirror 24, onto the information recording surface of the optical recording medium 26. Even when a light beam reflected by the information recording surface of the optical recording medium 26 follows the same optical path as in travel to the optical recording medium, and passes through the 5λ/4 plate 23 again, the light beam reflected by the information recording surface of the optical recording medium 26 maintains a linearly polarized light beam whose polarization direction is the same as that of the light beam emitted from the first semiconductor laser element 51. The incident light which has passed through the 5λ/4 plate 23 and entered the second polarizing hologram diffraction grating 8, is transmitted by the second polarizing hologram diffraction grating 8 and enters the first polarizing hologram diffraction grating 7. The light beam which has entered the first polarizing hologram diffraction grating 7 is diffracted by the first polarizing hologram diffraction grating 7. Among the diffracted lights, either + first-order diffraction light or − first-order diffraction light is received by the light receiving element 9.

When the linearly polarized laser light beam whose wavelength is 650 nm, emitted from the second semiconductor laser element 52 enters the 5λ/4 plate 23, it is converted to a circularly polarized light beam which is clockwise, and thereafter, reflected and guided to the objective lens 25 by the erecting mirror 24. The objective lens 25 condenses the light beam reflected by the erecting mirror 24 onto the information recording surface of the optical recording medium 26. A light beam reflected by the information recording surface of the optical recording medium 26 is converted to a circularly polarized light beam, which is reverse, that is, counterclockwise to the light beam traveling to the optical recording medium, and follows the same optical path as in travel to the optical recording medium. The reflected light beam passes through the 5λ/4 plate 23 again, thereby being converted from a circularly polarized light beam to a linearly polarized light beam. In this regard, this polarization direction is converted to a polarization direction perpendicular to the polarization direction traveling to the optical recording medium. With the result that all incident lights which have passed through the 5λ/4 plate 23 and entered the second polarizing hologram diffraction grating 8, are diffracted in a direction toward the light receiving element 9 by the second polarizing hologram diffraction grating 8 and then, this diffracted light is received by the light receiving element 9. The light beam diffracted by the second polarizing hologram diffraction grating 8 enters the first polarizing hologram diffraction grating 7 on the way of the optical path toward the light emitting element 9, but all the lights which have entered the first polarizing hologram diffraction grating 7, are transmitted by the first polarizing hologram diffraction grating 7.

According to the embodiment, the polarizing hologram diffraction gratings are separately disposed for the respective oscillation wavelengths. In specific, the first polarizing hologram diffraction grating 7 and the second polarizing hologram diffraction grating 8 are disposed. Therefore, as compared with when an optical adjustment such as an optical axis adjustment is executed for two light beams of different wavelengths by one polarizing hologram diffraction grating, it is possible to execute the optical adjustment with high accuracy, and it is possible to ease the accuracy of mounting the integrated semiconductor laser element unit 2 and the light receiving element 9. Consequently, the tolerance of assembly is eased, and a yield can be increased.

Figure 4:
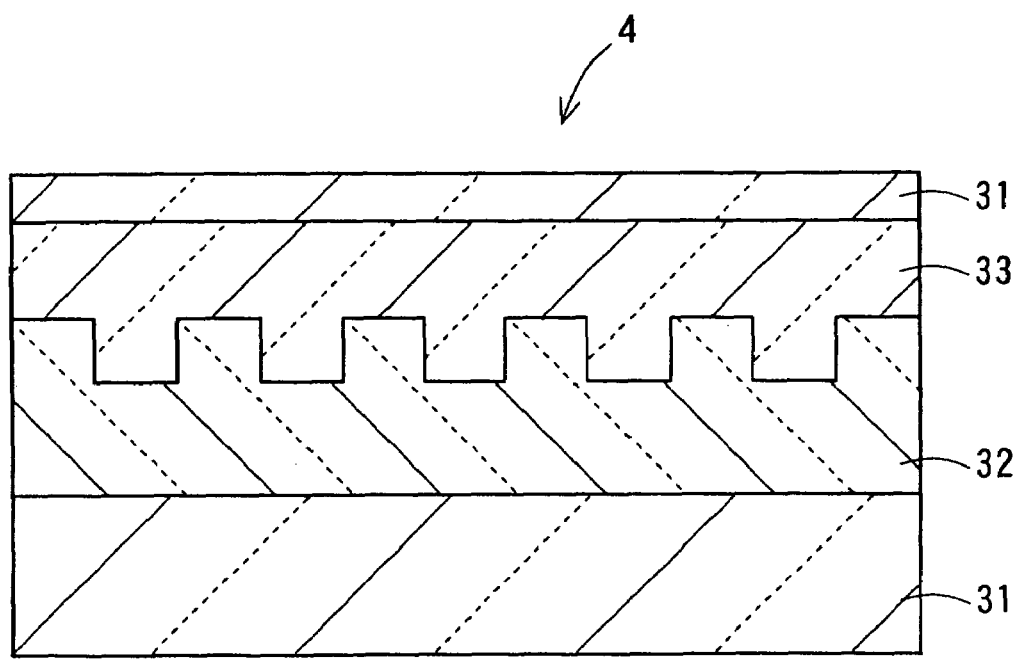
FIG. 4 is a cross sectional view showing a first polarizing hologram substrate.

FIG. 4 is a cross sectional view showing the first polarizing hologram substrate 4. The first polarizing hologram substrate 4 includes a light transmitting substrate 31, a birefringent layer 32 and an isotropic overcoat layer 33. The light transmitting substrate 31 is made of glass, plastic or the like. The birefringent layer 32 has a diffraction surface having a concave-and-convex periodic shape, and is made of a birefringent material. The birefringent material is a film which represents anisotropy such that a refraction index of light vibrating in a direction parallel to a sheet surface of FIG. 4 is different from a refraction index of light vibrating in a direction perpendicular to the sheet surface. In the embodiment, the birefringent layer 32 is formed by polymerizing a polymerizing liquid crystal monomer with light or heat, for instance. It is preferable to select the liquid crystal monomer from among acrylic ester or methacrylic ester. It is preferable that one or more phenyl groups, specifically, two or three phenyl groups are contained in an alcohol residue constituting ester. Further, one cyclohexyl group may be contained in the alcohol residue constituting ester. Besides, on the polarizing hologram substrate using a liquid crystal polymer formed by polymerizing the liquid crystal monomers, a temperature dependency of diffraction efficiency is considerably small. However, in a case where the polarizing hologram substrate is mounted for use on vehicles such as a four-wheeled motor vehicle in which a temperature condition changes significantly, there sometimes arises a problem of a deterioration of signal-to-noise ratio (S/N ratio) brought by the decrease of the diffraction efficiency. In order to solve this problem, used is a liquid crystal polymer formed by polymerizing liquid crystal compositions including a non-crosslinked liquid crystal monomer of 50% by weight or more and less than 90% by weight and a crosslinked liquid crystal monomer of 5% by weight or more and less than 50% by weight. A photo-polymerizing liquid crystal monomer which is polymerized by light, is able to obtain as high diffraction efficiency as a birefringent crystal by being made to be a liquid crystal polymer by photopolymerization after controlling a crystal aligning state.

The isotropic overcoat layer 33 is formed by, for instance, a spreading method of spreading an amorphous polymer solution which is optically isotropic on the birefringent layer 32 and thereafter volatilizing the solution, or a photopolymerization method of spreading a monomer and thereafter conducting photopolymerization. Especially, the photopolymerization method is preferable because it is simple. The monomer is styrene, a derivative of styrene, acrylic ester, a derivative of acrylic ester, methacrylic ester and a derivative of methacrylic ester. Moreover, an oligomer having polymerizing functional groups on both ends of a molecule, such as acrylic polyether, acrylic urethane and acrylic epoxy, may be used independently or in combination.

The second polarizing hologram substrate 5 includes the light transmitting substrate 31, the birefringent layer 32 and the isotropic overcoat layer 33. This constitution is identical to that of the first polarizing hologram substrate 4 shown in FIG. 4. Since the second polarizing hologram substrate 5 is formed in the same manner as the first polarizing hologram substrate 4, corresponding portions of the second polarizing hologram substrate 5 will be denoted by the same reference numerals to omit descriptions thereof. In the embodiment, the birefringent layer 32 included in the first polarizing hologram substrate 4 is identical to the first polarizing hologram diffraction grating 7, whereas the birefringent layer 32 included in the second polarizing hologram substrate 5 is identical to the second polarizing hologram diffraction grating 8.

In a case where the laser light beam emitted from the first and second semiconductor laser elements 51, 52 enters the birefringent layer 32 of the first polarizing hologram substrate 4, controlled is the liquid crystal aligning state of the birefringent layer 32 formed on the light transmitting substrate 31 included in the first polarizing hologram substrate 4 shown in FIG. 4. To be specific, the liquid crystal aligning state is controlled so that a refractive index of an optical anisotropic polymer of the birefringent layer 32 is a refractive index of an ordinary light with respect to a linearly polarized light beam (hereinafter, occasionally referred to as a 'first polarization direction') having an electric vector along a direction perpendicular to a direction of a groove of a diffraction grating formed in the first polarizing hologram diffraction grating 7, that is a direction perpendicular to a drawing sheet of FIG. 4. Further, the liquid crystal aligning state is controlled so that a refractive index of an optical anisotropic polymer of the birefringent layer 32 is a refractive index of an extraordinary light with respect to a linearly polarized light beam (hereinafter, occasionally referred to as a 'second polarization direction') having an electric vector along a direction parallel to a direction of a groove of a diffraction grating formed in the first polarizing hologram diffraction grating 7, that is a direction perpendicular to a drawing sheet of FIG. 4. With the result that a refractive index of the isotropic overcoat layer 33 corresponds to the refractive index of the extraordinary light.

When the light beam emitted from the first semiconductor laser element 51 enters the beam splitting diffraction grating 6, it is split into three light beams. In an explanation below, there will be described a zero-order light which is a main beam having the highest intensity among the three split light beams. A light beam polarized in the first polarized direction (hereinafter, occasionally simply referred to as a 'first polarization direction'), emitted from the first semiconductor laser element 51, which has passed through the beam splitting diffraction grating 6, is diffracted when this light beam enters the first polarizing hologram diffraction grating 7. Since the first polarizing hologram diffraction grating 7 gives the isotropic overcoat layer 33 and the birefringent layer 32 different refractive indexes with respect to the light beam in the first polarization direction, the diffraction efficiency ratio of the zero-order light and the first-order diffraction light is adjusted by controlling a dimension in a thickness direction of a to-be-formed diffraction grating groove. The light beam which has passed through the first polarizing hologram diffraction grating 7 is transmitted by the second polarizing hologram diffraction grating 8 and then, enters the 5λ/4 plate 23. The light beam emitted from the first semiconductor laser element 51 remains as the light in the first polarization direction while being transmitted by the 5λ/4 plate 23 and then, is condensed onto the information recording surface of the optical recording medium 26. Even when the light beam in the first polarization direction, which has been reflected by the information recording surface of the optical recording medium 26 follows the same optical path as in travel to the optical recording medium 26, and passes through the 5λ/4 plate 23 again, the polarization direction remains as the first polarization direction which is the same as the polarization direction in which the lights beam is emitted from the first semiconductor laser element 51. Even when the light beam in the first polarization direction, which has passed through the 5λ/4 plate 23, enters the second polarizing hologram diffraction grating 8, this light beam is hardly diffracted and then, is transmitted. When the light beam in the first polarization direction enters the first polarizing hologram diffraction grating 7, as in travel to the optical recording medium 26, the isotropic overcoat layer 33 and the birefringent layer 32 have different refractive indexes and therefore, the light in the first polarization direction is diffracted.

In a case where the laser light beam emitted from the first and second semiconductor laser elements 51, 52 enters the birefringent layer 32 of the first polarizing hologram substrate 4, controlled is the liquid crystal aligning state of the birefringent layer 32 formed on the light transmitting substrate 31 included in the second polarizing hologram substrate 5. To be specific, the liquid crystal aligning state is controlled so that a refractive index of an optical anisotropic polymer of the birefringent layer 32 is a refractive index of an ordinary light with respect to a linearly polarized light beam (hereinafter, occasionally referred to as a 'first polarization direction') having an electric vector along a direction perpendicular to a direction of a groove of a diffraction grating formed in the second polarizing hologram diffraction grating 8. Further, the liquid crystal aligning state is controlled so that a refractive index of a optical anisotropic polymer of the birefringent layer 32 is a refractive index of an extraordinary light with respect to a linearly polarized light beam (hereinafter, occasionally referred to as a 'second polarization direction') having an electric vector along a direction parallel to a direction of a groove of a diffraction grating formed in the second polarizing hologram diffraction grating 8. With the result that a refractive index of the isotropic overcoat layer 33 corresponds to the refractive index of the ordinary light.

The light beam in the first polarization direction, emitted from the second semiconductor laser element 52 is transmitted by the beam splitting diffraction grating 6, and then enters the first polarizing hologram diffraction grating 7. The light beam in the first polarization direction is diffracted by the first polarizing hologram diffraction grating 7. As described above, since the first polarizing hologram diffraction grating 7 gives the isotropic overcoat layer 33 and the birefringent layer 32 different refractive indexes with respect to the light beam in the first polarization direction, the diffraction efficiency ratio of the zero-order light and the first-order diffraction light is adjusted by controlling a dimension in a thickness direction of a to-be-formed diffraction grating groove. The light beam which has passed through the first polarizing hologram diffraction grating 7 is transmitted by the second polarizing hologram diffraction grating 8 and then, enters the 5λ/4 plate 23. The linearly polarized light beam of the second wavelength is converted to a circularly polarized light beam by the 5λ/4 plate 23 and then condensed onto the information recording surface of the optical recording medium 26. The light beam which has been reflected by the information recording surface of the optical recording medium 26 follows the same optical path as in travel to the optical recording medium 26, and passes through the 5λ/4 plate 23 again and then, is converted to a light beam which is polarized in the second polarization direction (hereinafter, occasionally simply referred to as a 'light beam in second polarization direction') perpendicular to the first polarization direction. The light beam in the second polarization direction enters the second polarizing hologram diffraction grating 8 and then, is diffracted because the isotropic overcoat layer 33 and the birefringent layer 32 have different refractive indexes. The diffracted light is guided to the light receiving element 9. Theoretically, there is obtained the light beam up to 40% or the like as the + first-order diffraction light and up to 40% or the like as the − first-order diffraction light. The light beam which has been diffracted by the second polarizing hologram diffraction grating 8, to be specific, either + first-order diffraction light or − first-order diffraction light, enters the first polarizing hologram diffraction grating 7 on the way of the optical path toward the light receiving element 9 and then, is transmitted under no influence.

Figure 5A:
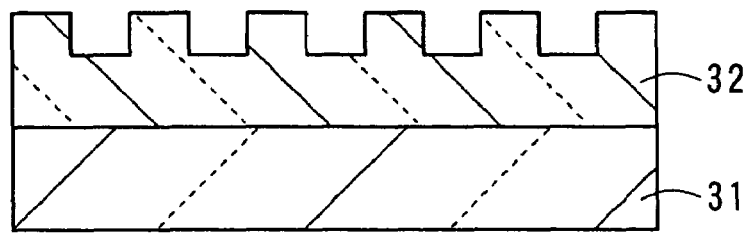
FIGS. 5A to 5C are views for describing the steps in manufacture of the first polarizing hologram substrate.
Figure 5B:
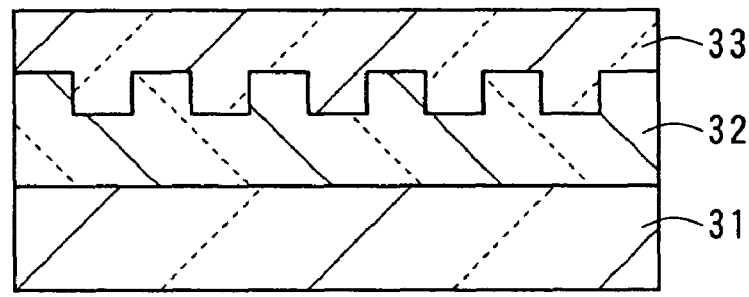
Figure 5C:
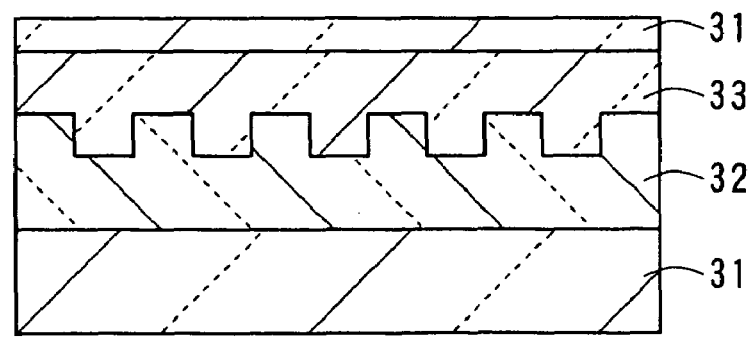
Figure 6:
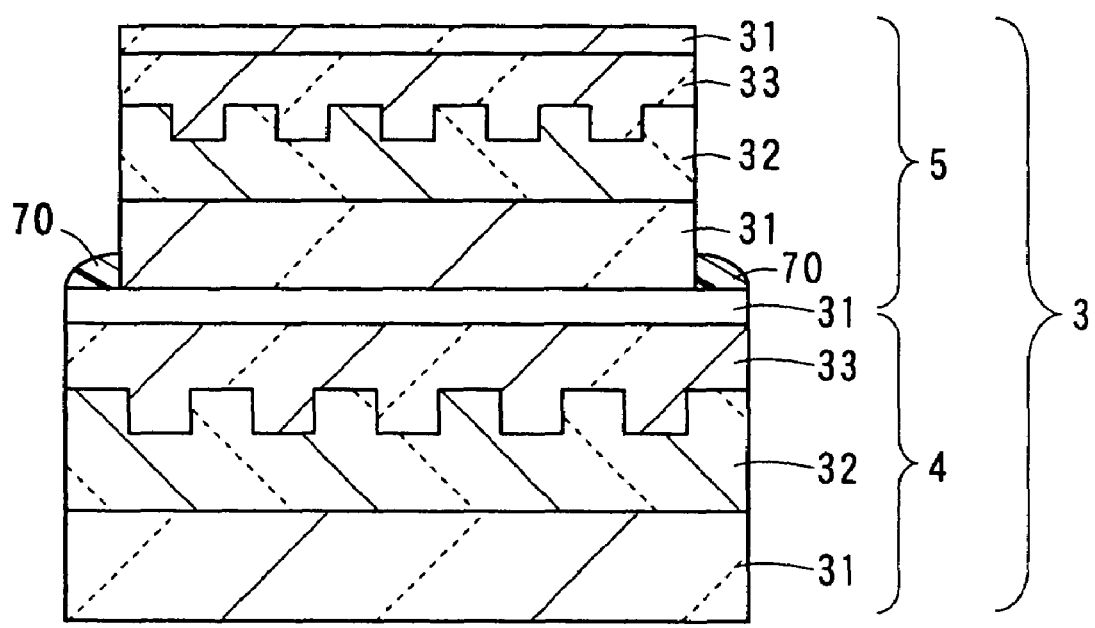
FIG. 6 is a cross sectional view showing the hologram coupled member.

FIGS. 5A to 5C are views for describing the steps in manufacture of the first polarizing hologram substrate 4. FIG. 6 is a cross sectional view showing the hologram coupled member 3. Firstly, as shown in FIG. 5A, the birefringent layer 32 is formed on the light transmitting substrate 31. The birefringent layer 32 is formed by polymerizing the polymerizing liquid crystal monomer with light or heat, for instance. Secondly, as shown in FIG. 5B, the isotropic overcoat layer 33 is formed on the diffraction surface of the birefringent layer 32. As described above, the isotropic overcoat layer 33 is formed by, for instance, the spreading method and the photopolymerization method. After the isotropic overcoat layer 33 is formed, the light transmitting substrate 31 is formed on the isotropic overcoat layer 33 as shown in FIG. 5C. By following the above steps, the first polarizing hologram substrate 4 is formed. The second polarizing hologram substrate 5 is formed according to the same steps in manufacture of the first polarizing hologram substrate 4.

After the first and second polarizing hologram substrates 4, 5 are formed according to the aforementioned manufacture steps, the first polarizing hologram substrate 4 and the second polarizing hologram substrate 5 are laminated to form the hologram coupled member 3 according to manufacture steps described below. In the embodiment, the first polarizing hologram substrate 4 is joined to one surface in a thickness direction of the cap 12 of the semiconductor laser apparatus 14 in a state where a peripheral region thereof is exposed, and the second polarizing hologram substrate 5 is joined to one surface in a thickness direction of the first polarizing hologram substrate 4 in a state where a peripheral region thereof is exposed. Firstly, the first polarizing hologram substrate 4 is placed on the surface of the cap 12, and further, the second polarizing hologram substrate 5 is placed on the surface of the first polarizing substrate 4. And then, the first semiconductor laser element 51 is caused to emit a laser light beam whose oscillation wavelength is 780 nm, and an offset adjustment in a focus error signal (hereinafter, occasionally referred to as an 'FES') and a tracking error signal (hereinafter, occasionally referred to as a 'TES') and an optical adjustment such as an optical axis adjustment are executed.

Secondly, after the second semiconductor laser element 52 is caused to emit the laser light beam whose oscillation wavelength is 650 nm, and the optical adjustment in an FES and a TES is executed, by applying a light transmitting adhesive such as an ultraviolet cure resin, and irradiating with ultraviolet rays to a corner portion where the peripheral region of the semiconductor laser apparatus 14 and an outer peripheral surface of the first polarizing hologram substrate 4, the surface facing the peripheral region of the semiconductor laser apparatus 14, cross each other, the first polarizing hologram substrate 4 is adhered to the cap 12 of the semiconductor laser apparatus 14. Furthermore, by applying a light transmitting adhesive such as an ultraviolet cure resin 70, and irradiating with ultraviolet rays to a corner portion where the peripheral region of the semiconductor laser apparatus 14 and an outer peripheral surface of the second polarizing hologram substrate 5, the surface facing the peripheral region of the first polarizing hologram substrate 4, cross each other, the second polarizing hologram substrate 5 is adhered to the first polarizing hologram substrate 4. By following the aforementioned manufacture steps, the hologram coupled member 3 that the first polarizing hologram substrate 4 and the second polarizing hologram substrate 5 are laminated so as to be integrated as shown in FIG. 6. In the embodiment, the order of laminating the first polarizing hologram substrate 4 and the second polarizing hologram substrate 5 is identical to the order of assembly.

In the first and second polarizing hologram substrates 4, 5, as shown in FIG. 6, the isotropic overcoat layer 33 is formed on the diffraction surface of the birefringent layer 32, and further the light transmitting substrate 31 is formed on the isotropic overcoat layer 33. The respective surfaces of the first and second polarizing hologram substrates 4, 5, the surfaces facing each other, are planes in parallel. Accordingly, in a case where the second polarizing hologram substrate 5 is laminated on the first polarizing hologram substrate 4 and then the optical adjustment such as an optical axis adjustment for the second polarizing hologram diffraction grating 8 is executed, it is possible to easily perform on the surface of the first substrate, the surface facing the second substrate, operations such that the second substrate is caused to be moved in a horizontal direction and such that the second substrate is caused to be rotated. Furthermore, the rotary operation for the optical adjustment as described above, or the like prevents the first polarizing hologram diffraction grating 7 from being damaged. Consequently, as in a case of using a relief hologram having irregularity on a substrate surface thereof, there is no need for interposing silica glass, acrylic resin or the like between the respective surfaces of the two substrates, the surfaces facing each other, and therefore the number of manufacture steps can be reduced. The reduction of the number of the manufacture steps facilitates the manufacture of the hologram coupled member 3. In addition, the reduction of the number of the manufacture steps allows reduction of the cost for manufacturing the hologram coupled member 3.

Figure 7A:
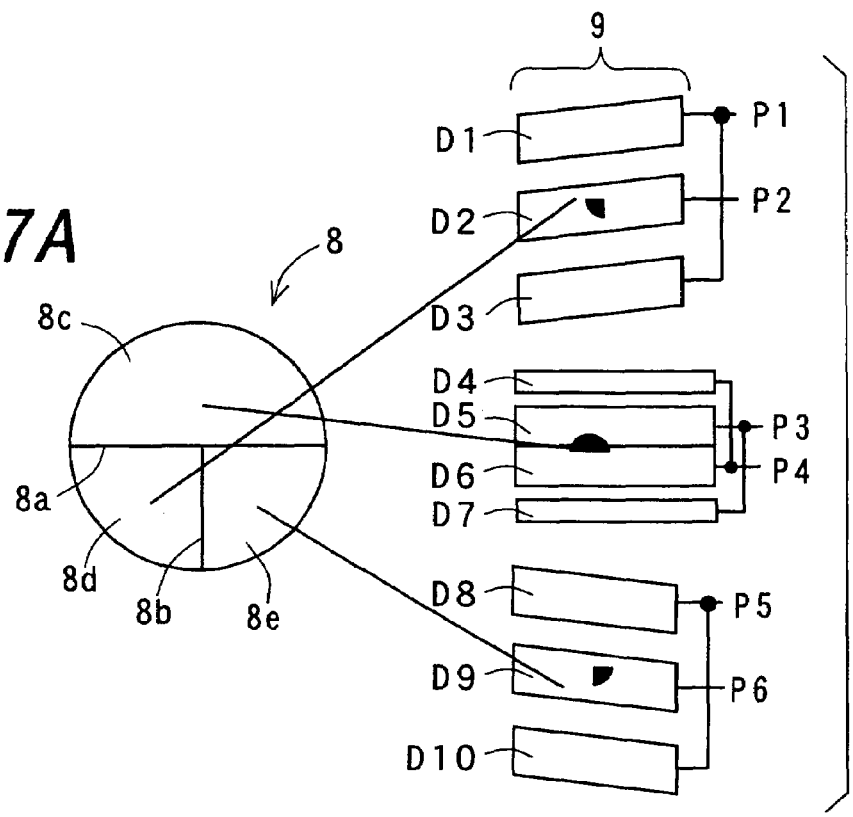
FIGS. 7A and 7B are views showing first and second polarizing hologram diffraction gratings and a light receiving element for receiving a light beam diffracted by the first and second polarizing hologram diffraction gratings.
Figure 7B:
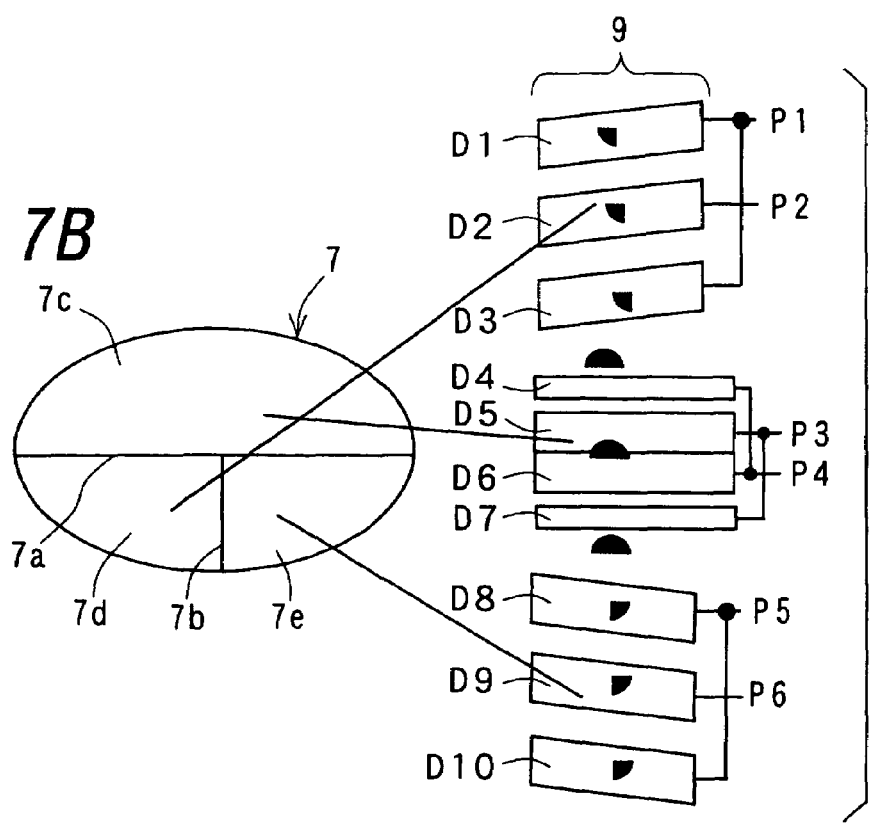

FIGS. 7A and 7B are views for showing the first and second polarizing hologram diffraction gratings 7, 8 and the light receiving element 9 for receiving a light beam diffracted by the first and second polarizing hologram diffraction gratings 7, 8. FIG. 7A is a view showing the second polarizing hologram diffraction grating 8, and an example of spot shapes of light beams obtained when reflection light by the optical recording medium 26 of a laser light beam emitted from the second semiconductor laser element 52 is diffracted by the second polarizing hologram diffraction grating 8 and enters the light receiving element 9. FIG. 7B is a view showing the first polarizing hologram diffraction grating 7, and an example of spot shapes of light beams obtained when reflection light by the optical recording medium 26 of a laser light beam emitted from the first semiconductor laser element 51 is diffracted by the first polarizing hologram diffraction grating 7 and enters the light receiving element 9.

The second polarizing hologram diffraction grating 8 shown in FIG. 7A diffracts a light beam emitted from the second semiconductor laser element 52 and reflected by the information recording surface of a DVD, and guides the diffracted light beam to the light receiving element 9. The first polarizing hologram diffraction grating 7 shown in FIG. 7B diffracts a light beam emitted from the first semiconductor laser element 52 and reflected by the information recording surface of a CD, and guides the diffracted light beam to the light receiving element 9.

In order to detect an output signal obtained when the spot shape of the light beam on the light receiving element 9 changes with relative movement of the optical recording medium 26 and the objective lens 25, and keep a space between the optical recording medium 26 and the objective lens 25 fixed, it is necessary to split the first and second polarizing hologram diffraction gratings 7, 8 into at least two grating regions, respectively. The second polarizing hologram diffraction gratings 8 of the embodiment is a circular shape as shown in FIG. 7A, and the first polarizing hologram diffraction grating 7 is an elliptical shape as shown in FIG. 7B. Moreover, the first and second polarizing hologram diffraction gratings 7, 8 have first grating regions 8c, 7c, second grating regions 8d, 7d, and third grating regions 8e, 7e as shown in FIGS. 7A and 7B.

In a case where the first-order diffraction light in the second polarization direction, reflected by the information recording surface of the optical recording medium 26 and diffracted by the second polarizing hologram diffraction grating 8, enters the first polarizing hologram diffraction grating 7 formed on the first polarizing hologram substrate 4, the light which has entered the first polarizing hologram diffraction grating 7 is not diffracted while being transmitted. At this time, transmission characteristics of the light transmitted by the first polarizing hologram diffraction grating 7, and the light transmitted by a substrate surface other than the first polarizing hologram diffraction grating 7 should be ideally identical, but slightly different in practice and therefore, the first polarizing hologram diffraction grating 7 is preferably formed into a shape such that all the lights diffracted by the second polarizing hologram diffraction grating 8 enter the first polarizing hologram diffraction grating 7. Consequently in the embodiment, by forming the first polarizing hologram diffraction grating 7 into the elliptical shape, all the first-order diffraction lights in the second polarization direction, diffracted by the second polarizing hologram diffraction grating 8 can be caused to enter the first polarizing hologram diffraction grating 7 and be transmitted. To be specific, a long axis of the ellipse is designed to have such a dimension that the first-order diffraction light in the second polarization direction, diffracted by the second polarizing hologram diffraction grating 8 enters, and formed so as to be longer than a variation range of incident positions due to variation of the wavelength of the second semiconductor laser element 52 serving as a light source. Thus, even when the wavelength of the second semiconductor laser element 52 varies because of a change in temperature or the like, it is possible to securely transmit a light beam and obtain a desired signal. Furthermore, the long axis of the ellipse is disposed so as to be perpendicular to a track direction on the information recording surface of the optical recording medium 26. This can locate a longitudinal direction of a beam shape in a direction perpendicular to a longitudinal direction of a pit and therefore, a favorable jitter characteristic can be obtained. Consequently, it is possible to more correctly record information onto the optical recording medium 26 and play back the information recorded on the optical recording medium 26. Moreover, when a short axis of the ellipse is designed to have such lengths that a light beam having a diameter determined based on a numerical aperture (abbreviated as NA) of the collimation lens 22 can enter, the short axis of the ellipse is formed so as to have such lengths that the first-order diffraction light in the second polarizing direction, diffracted by the second polarizing hologram diffraction grating 8 can enter.

Each of the first grating regions 8c, 7c is one of two semicircular regions obtained by splitting each of circular regions with each of first splitting lines 8a, 7a. Each of the second grating regions 8d, 7d is one of two quarter-circular regions obtained by splitting the other semicircular region of the two semicircular regions with each of second splitting lines 8b, 7b which are perpendicular to the first splitting lines 8a, 7a. Each of the third grating regions 7e, 8e is the other region of the two quarter-circular regions.

The light receiving element 9 has a plurality of light receiving regions for receiving light beams diffracted by the first grating regions 7c, 8c, the second grating regions 7d, 8d and the third grating regions 7e, 8e of the first and second polarizing hologram diffraction gratings 7, 8, respectively. The light receiving element 9 of the embodiment has ten light receiving regions D1 to D10 as shown in FIGS. 7A and 7B. The respective light receiving regions D1 to D10 are selectively used for reading information of a CD and a DVD and detecting an FES, a TES and a reproduction signal (abbreviated as RF).

The light beam reflected by the optical recording medium 26 and diffracted by the first grating region 8c of the second polarizing hologram diffraction grating 8, enters a center portion in a transverse direction of two light receiving regions D5, D6 of the respective light receiving regions of the light receiving element 9. Moreover, the light beam reflected by the optical recording medium 26 and diffracted by the second grating region 8d of the second polarizing hologram diffraction grating 8, enters a light receiving region D2 of the light receiving element 9. The light beam diffracted by the third grating region 8e of the second polarizing hologram diffraction grating 8, enters a light receiving region D9 of the light receiving element 9. The light beam reflected by the optical recording medium 26 and diffracted by the first grating region 7c of the first polarizing hologram diffraction grating 7, enters the center portion in the transverse direction of the two light receiving regions D5, D6 of the respective light receiving regions of the light receiving element 9. Moreover, the light beam reflected by the optical recording medium 26 and diffracted by the second grating region 7d of the first polarizing hologram diffraction grating 7, enters the light receiving region D2 of the light receiving element 9. The light beam diffracted by the third grating region 7e of the first polarizing hologram diffraction grating 7, enters the light receiving region D9 of the light receiving element 9. To describe further, the light beam diffracted by the respective grating regions 7c to 7e of the first polarizing hologram diffraction grating 7 and caused to enter the light receiving regions D2, D5, D6, D9 of the light receiving element 9, is a main beam of the light beams emitted from the first and second semiconductor laser elements 51, 52 and split by the beam splitting diffraction grating 6. The light beam caused to enter the light receiving regions D1, D3, D8, D9, D10 is a sub beam of the light beams emitted from the first and second semiconductor laser elements 51, 52 and split by the beam splitting diffraction grating 6.

Further, the light receiving element 9 is disposed so that longitudinal directions of the respective light receiving regions D1 to D10 become parallel to directions of diffraction by the first and second polarizing hologram diffraction gratings 7, 8. The respective light receiving regions D1 to D10 are formed so that lengths in the longitudinal directions become longer than a variation range of incident positions due to variation of the wavelengths of the first and second semiconductor laser elements 51, 52. Thus, even when the wavelengths of the first and second semiconductor laser elements 51, 52 vary because of a change in temperature or the like, it is possible to securely receive the light beam and obtain a desired signal. Moreover, since capacitance increases and response speeds of the respective light receiving regions D1 to D10 decrease in a case where the lengths in the longitudinal directions of the respective light receiving regions D1 to D10 are made to be excessively long, the light receiving element 9 is disposed so as to be formed to have lengths such that the capacitance does not influence on the response speeds.

In the embodiment, a knife-edge method is used for detection of an FES necessary for reading information of a DVD and a CD. Moreover, in the embodiment a Differential Phase Detection (abbreviated as DPD) method is used for detection of a TES necessary for reading information of a DVD, and a Differential Push-Pull (abbreviated as DPP) method is used for detection of a TES necessary for reading information of a CD. In FIGS. 7A and 7B, RFs of a CD and a DVD are detected on the basis of output signals of the light receiving regions D2, D4, D5, D6, D7, D9. Moreover, a TES of a DVD based on the DPD method is detected on the basis of the output signals of the light receiving regions D2 and D9. As described above, a high response speed is demanded of the light receiving region for detecting signals containing high-frequency components like an RF and a TES based on the DPD method and requiring rapid reading of a reproduction signal of the optical recording medium 26.

Furthermore, a TES of a CD is detected on the basis of output signals of the light receiving regions D1, D3, D8, D10, and FESs of a CD and a DVD are detected on the basis of the output signals of the light receiving regions D4, D5, D6, D7. A high response speed is not demanded of the light receiving regions D1, D3, D8, D10 for detecting a TES of a CD. Moreover, a high response speed is not demanded of the light receiving regions D4, D7, because these light receiving regions are for countervailing a stray light to an FES caused at the time of reading a DVD, which is a two-layer disk, and light does not enter these regions during reproduction of signals.

In FIGS. 7A and 7B, in order to reduce the number of output terminals of the hologram laser unit 1, the light receiving regions for detecting the same signal may be internally connected. For instance, in the embodiment, it is possible to internally connect the light receiving region D4 and the light receiving region D6, and connect the light receiving region D5 and the light receiving region D7, which are for detecting an FES, respectively. Moreover, it is possible to internally connect the light receiving region D1 and the light receiving region D3, and connect the light receiving region D8 and the light receiving region D10, which are for detecting a TES based on the DPP method, respectively. In FIGS. 7A and 7B, an output signal at the time of internally connecting the light receiving region D1 and the light receiving region D3 is denoted by P1, an output signal at the time of internally connecting the light receiving region D5 and the light receiving region D7 is denoted by P3, an output signal at the time of internally connecting the light receiving region D4 and the light receiving region D6 is denoted by P4, and an output signal at the time of internally connecting the light receiving region D8 and the light receiving region D10 is denoted by P5. Moreover, the output signals of the light receiving regions D2, D6 are denoted by P2, P6, respectively.

An FES, a TES and an RF based on the signals outputted from the respective light receiving regions D1 to D10 when a light beam reflected on the information recording surface of a DVD is diffracted by the second polarizing hologram diffraction grating 8 and received by the respective light receiving regions D1 to D10 of the light receiving element 9 are found by expressions (1) to (3) described below, respectively:

$$FES = P3 - P4 \tag{1}$$

$$TES = \text{Phase}(P2 - P6) \tag{2}$$

$$RF = P2 + P3 + P4 + P6 \tag{3}$$

An FES, a TES and an RF based on the signals outputted from the respective light receiving regions D1 to D10 when a light beam reflected on the information recording surface of a CD is diffracted by the first polarizing hologram diffraction grating 7 and received by the respective light receiving regions D1 to D10 of the light receiving element 9 are found by expressions (4) to (6) described below, respectively:

$$FES = P3 - P4 \tag{4}$$

$$TES = (P2 - P6) - K(P1 - P5) \tag{5}$$

$$RF = P2 + P3 + P4 + P6 \tag{6}$$

Here, the coefficient K of the expression (5) is a constant for correcting a light amount ratio of the one main beam and the two sub beams diffracted by the three-beam diffraction grating 6. The coefficient K when the light amount ratio of the main beam:the sub beam:the sub beam is equal to a:b:b (a, b are natural numbers) is given by an expression $K = a/(2b)$.

As described above, the knife-edge method is used for detection of an FES necessary for reading information of a DVD and a CD, the DPD method is used for detection of a TES necessary for reading information of a DVD, and the DPP method is used for detection of a TES necessary for reading information of a CD in the light receiving element 9 shown in FIGS. 7A and 7B, however, a spot size method may be used for detection of an FES necessary for reading information of a DVD and a CD, the DPP method may be used for detection of a TES necessary for reading information of a DVD, and the DPD method may be used for detection of a TES necessary for reading information of a CD, for instance.

Figure 8A:
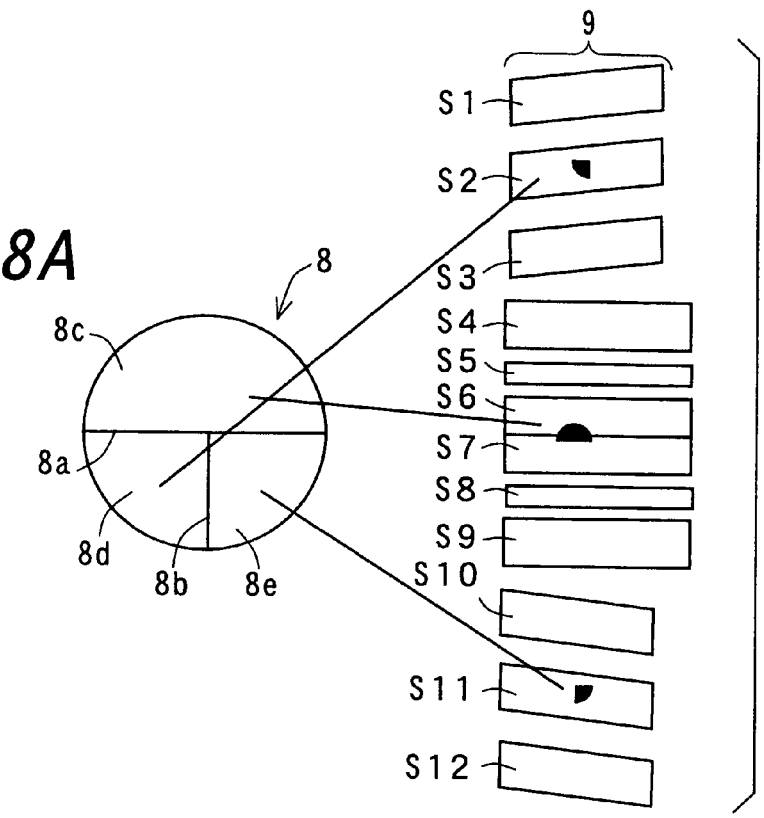
FIGS. 8A and 8B are views showing the first and second polarizing hologram diffraction gratings and a light receiving element for receiving a light beam diffracted by the first and second polarizing hologram diffraction gratings.
Figure 8B:
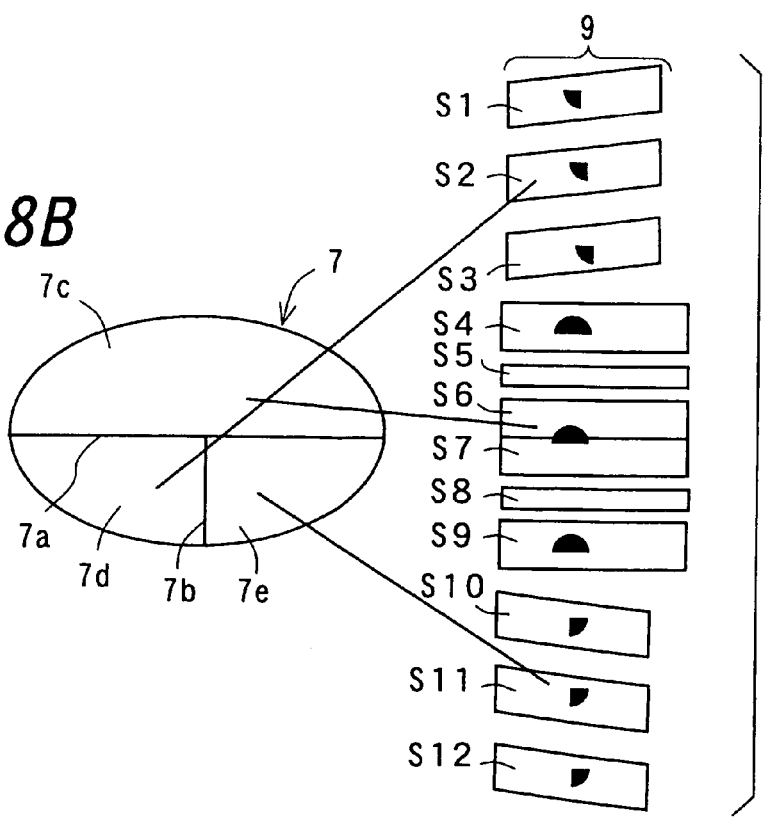

FIGS. 8A and 8B are views showing the first and second polarizing hologram diffraction gratings 7, 8, and the light receiving element 9 for receiving light beams diffracted by the first and second polarizing hologram diffraction gratings 7, 8. FIG. 8A is a view showing the second polarizing hologram diffraction grating 8, and an example of spot shapes of light beams obtained when reflection light by the optical recording medium 26 of a laser light beam emitted from the second semiconductor laser element 52 is diffracted by the second polarizing hologram diffraction grating 8 and enters the light receiving element 9. FIG. 8B is a view showing the first polarizing hologram diffraction grating 7, and an example of spot shapes of light beams obtained when reflection light by the optical recording medium 26 of a laser light beam emitted from the first semiconductor laser element 51 is diffracted by the first polarizing hologram diffraction grating 7 and enters the light receiving element 9.

The second polarizing hologram diffraction grating 8 shown in FIG. 8A diffracts a light beam emitted from the second semiconductor laser element 52 and reflected by the information recording surface of a DVD, and guides the diffracted light beam to the light receiving element 9. The first polarizing hologram diffraction grating 7 shown in FIG. 8B diffracts a light beam emitted from the first semiconductor laser element 51 and reflected by the information recording surface of a CD, and guides the diffracted light beam to the light receiving element 9. Since the first and second polarizing hologram diffraction gratings 7, 8 shown in FIGS. 8A and 8B have the same shapes and functions as the first and second polarizing hologram diffraction gratings 7, 8 shown in FIGS. 7A and 7B, corresponding portions will be denoted by the same reference numerals to omit descriptions thereof.

The light receiving element 9 shown in FIGS. 8A and 8B has a plurality of light receiving regions for receiving light beams diffracted by the first grating regions 7c, 8c, the second grating regions 7d, 8d and the third grating regions 7e, 8e of the first and second polarizing hologram diffraction gratings 7, 8, respectively. As shown in FIGS. 8A and 8B, the light receiving element 9 has twelve light receiving regions S1 to S12. The respective light receiving regions S1 to S12 are selectively used for reading information of a CD and a DVD and detecting an FES, a TES and an RF.

The light beam reflected by the optical recording medium 26 and diffracted by the first grating region 8c of the second polarizing hologram diffraction grating 8, enters a center portion in a transverse direction of two light receiving regions S6, S7 of the respective light receiving regions of the light receiving element 9. Moreover, the light beam reflected by the optical recording medium 26 and diffracted by the second grating region 8d of the second polarizing hologram diffraction grating 8, enters a light receiving region S2 of the light receiving element 9. The light beam diffracted by the third grating region 8e of the second polarizing hologram diffraction grating 8, enters a light receiving region S11 of the light receiving element 9. The light beam reflected by the optical recording medium 26 and diffracted by the first grating region 7c of the first polarizing hologram diffraction grating 7, enters the center portion in the transverse direction of the two light receiving regions S6, S7 of the respective light receiving regions of the light receiving element 9. Moreover, the light beam reflected by the optical recording medium 26 and diffracted by the second grating region 7d of the first polarizing hologram diffraction grating 7, enters the light receiving region S2 of the light receiving element 9. The light beam diffracted by the third grating region 7e of the first polarizing hologram diffraction grating 7, enters the light receiving region S11 of the light receiving element 9. To describe further, the light beam diffracted by the respective grating regions 7c to 7e of the first polarizing hologram diffraction grating 7 and caused to enter the light receiving regions S2, S6, S7, S11 of the light receiving element 9, is a main beam of the light beams emitted from the first and second semiconductor laser elements 51, 52 and split by the beam splitting diffraction grating 6. The light beam caused to enter the light receiving regions S1, S3, S4, S9, S10, S12 is a sub beam of the light beams emitted from the first and second semiconductor laser elements 51, 52 and split by the beam splitting diffraction grating 6.

In FIGS. 8A and 8B, the knife-edge method is used for detection of an FES necessary for reading information of a DVD and a CD. Moreover, the DPD method is used for detection of a TES necessary for reading information of a DVD, and a three-beam method is used for detection of a TES necessary for reading information of a CD.

In FIGS. 8A and 8B, RFs of a CD and a DVD are detected on the basis of output signals of the light receiving regions S2, S5, S6, S7, S8, S11. Further, a TES of a DVD based on the DPD method is detected on the basis of the output signals of the light receiving regions S2 and S11. Furthermore, a TES of a CD is detected on the basis of output signals of the light receiving regions S1, S3, S4, S9, S10, S12. A high response speed is not demanded of the light receiving regions S5, S8, because these light receiving regions are for countervailing a stray light to an FES caused at the time of reading a DVD, which is a two-layer disk, and light does not enter these regions during reproduction of signals.

Although a state of internally connecting the light receiving regions for detecting the same signal is not shown in FIGS. 8A and 8B, the light receiving regions may be internally connected in the same manner as in FIGS. 7A and 7B, in order to reduce the number of the output terminals of the hologram laser unit 1. For instance, in the embodiment, it is possible to internally connect the light receiving region S5 and the light receiving region S7, and connect the light receiving region S6 and the light receiving region S8, which are for detecting an FES, respectively. Moreover, it is possible to internally connect the light receiving region S1, the light receiving region S4 and the light receiving region S10, and connect the light receiving region S3, the light receiving region S9 and the light receiving region S12, which are for detecting a TES based on the three-beam method, respectively.

An FES, a TES and an RF based on the signals outputted from the respective light receiving regions S1 to S12 when a light beam reflected on the information recording surface of a DVD is diffracted by the second polarizing hologram diffraction grating 8 and received by the respective light receiving regions S1 to S12 of the light receiving element 9 are found by expressions (7) to (9) described below, respectively:

$$FES=(S5+S7)-(S6+S8) \tag{7}$$

$$TES=S2-S11 \tag{8}$$

$$RF=S2+(S5+S7)+(S6+S8)+S11 \tag{9}$$

An FES, a TES and an RF based on the signals outputted from the respective light receiving regions S1 to S12 when a light beam reflected on the information recording surface of a CD is diffracted by the first polarizing hologram diffraction grating 7 and received by the respective light receiving regions S1 to S12 of the light receiving element 9 are found by expressions (10) to (12) described below, respectively:

$$FES=(S5+S7)-(S6+S8) \qquad (10)$$

$$TES=(S1+S4+S10)-(S3+S9+S12) \qquad (11)$$

$$RF=S2+(S5+S7)+(S6+S8)+S11 \qquad (12)$$

As described above, the knife-edge method is used for detection of an FES necessary for reading information of a DVD and a CD, the DPD method is used for detection of a TES necessary for reading information of a DVD, and the three-beam method is used for detection of a TES necessary for reading information of a CD in the light receiving element 9 shown in FIGS. 8A and 8B, however, the spot size method may be used for detection of an FES necessary for reading information of a DVD and a CD, and the DPP method may be used for detection of a TES necessary for reading information of a DVD and a CD, for instance.

As described above, according to the embodiment, the light beams of the first and second wavelengths emitted from the first and second semiconductor laser elements 51, 52 of the integrated semiconductor laser element unit 2, which have passed through the hologram laser unit 1 and the 5λ/4 plate 23 and then been reflected by the information recording surface of the optical recording medium 26, are diffracted in a direction securely toward the light receiving element 9 by the first and second polarizing hologram diffraction gratings 7, 8 and received by the light receiving element 9, respectively. Moreover, even when the light beam of the second wavelength reflected by the information recording surface of the optical recording medium 26, the light beam being polarized in the second polarization direction, enters the first polarizing hologram diffraction grating 7 on the way toward the light receiving element 9 after being diffracted by the second polarizing hologram diffraction grating 8, the first polarizing hologram diffraction grating 7 has such a property of transmitting the light beam which is polarized in the second polarization direction without diffracting the light beam, and therefore unnecessary light resulting from the incidence of the light beam diffracted by the second polarizing hologram diffraction grating 8 into the first polarizing hologram diffraction grating 7, is not generated. Accordingly, the amount of the light beam which should be received by the light receiving element does not decrease unlike in the related art, and therefore the efficiency of the use of light can be enhanced compared to the related art. This makes it possible to enhance the reliability.

Further, according to the embodiment, the hologram coupled member 3 is structured in a lamination of the first polarizing hologram substrate 4 on which the first polarizing hologram diffraction grating 7 is formed, and the second polarizing hologram substrate 5 on which the second polarizing hologram diffraction grating 8 is formed. The surfaces of the first and second polarizing hologram substrates 4, 5 which face each other, are plane. Accordingly, in a case where the second polarizing hologram substrate 5 is laminated on the first polarizing hologram substrate 4 and then an optical adjustment such as an optical axis adjustment for the second polarizing hologram diffraction grating 8 is executed, it is possible to easily perform on a surface of the first polarizing hologram substrate 4, the surface facing the second polarizing hologram substrate 5, operations such that the second polarizing hologram substrate 5 is caused to be moved in a horizontal direction and such that the second polarizing hologram substrate 5 is caused to be rotated. This makes it possible to simply execute the optical adjustment for the second polarizing hologram diffraction grating 8.

Further, according to the embodiment, the first semiconductor laser element 51 for emitting the light beam of the first wavelength, and the second semiconductor laser element 52 for emitting the light beam of the second wavelength are integrated as the integrated semiconductor laser element unit 2. This makes it possible to reduce the number of components in the hologram laser unit 1 and furthermore, the number of steps in assembly at the time of manufacturing the hologram laser unit 1 compared to a case where the first semiconductor laser element 51 and the second semiconductor laser element 52 are separately disposed without being integrated.

Further, according to the embodiment, the first wavelength is 780 nm, and the second wavelength is 650 nm. The light beam of the first wavelength of 780 nm emitted from the first semiconductor laser element 51 and reflected by the information recording surface of the optical recording medium 26, is transmitted by the second polarizing hologram diffraction grating 8 and diffracted by the first polarizing hologram diffraction grating 7 and then guided to the light receiving element 9. This makes it possible to detect a signal which is required for recording information onto a CD and playing back the information recorded on the CD. Moreover, the light beam of the second wavelength of 650 nm emitted from the second semiconductor laser element 52 and reflected by the information recording surface of the optical recording medium 26, is diffracted by the second polarizing hologram diffraction grating 8 and guided to the light receiving element 9. This makes it possible to detect a signal which is required for recording information onto a DVD and playing back the information recorded on the DVD.

Further, according to the embodiment, the first and second polarizing hologram diffraction gratings 7, 8 are formed so that the light beam of the first wavelength passes through the first and second polarizing hologram diffraction gratings 7, 8, and the light beam of the second wavelength passes through the first and second polarizing hologram diffraction gratings 7, 8. The first and second polarizing hologram diffraction gratings 7, 8 are formed so as to have such dimensions that are longer than a variation range of incident positions due to variation of the wavelengths of the first and second semiconductor laser elements 51, 52. Thus, even when the variation of the wavelengths of the first and second semiconductor laser elements occurs by variation in temperature or the like, the light beams of the first and second wavelengths emitted from the first and second semiconductor laser elements 51, 52 and reflected by the information recording surface of the optical recording medium 26 can be made to securely enter the first polarizing hologram diffraction grating 7, and further the light beam of the second wavelength emitted from the first and second semiconductor laser elements 51, 52 and reflected by the information recording surface of the optical recording medium 26 can be made to securely enter the second polarizing hologram diffraction grating 8. With the result that the first polarizing hologram diffraction grating 7 diffracts the incident laser light beam of the first wavelength toward the light receiving element 9, and the second polarizing hologram diffraction grating 8 diffracts the incident laser light beam of the second wavelength toward the light receiving element 9, and therefore it is possible to obtain the signal which is required for recording information onto an optical recording medium 26 and playing back the information recorded on the optical recording medium 26 on the basis of the respective light beam which is received by the light receiving element 9.

Further, according to the embodiment, the dimensions of the first and second polarizing hologram diffraction gratings 7, 8 are determined based on the numerical aperture of the collimation lens 22 which guides the light beam reflected by the optical recording medium 26 to the hologram coupled member 3. By thus determining the dimensions of the first and second polarizing hologram diffraction gratings 7, 8 based on the numerical aperture of the collimation lens 22, the dimensions of the first and second polarizing hologram diffraction gratings 7, 8 can be made minimal dimensions. This makes it possible to reduce a cost of manufacturing the first and second polarizing hologram diffraction gratings 7, 8, and easily manufacture the first and second polarizing hologram diffraction gratings 7, 8 compared to a case where the dimensions of the first and second polarizing hologram diffraction gratings 7, 8 are relatively large. In addition, even when the first and second polarizing hologram diffraction gratings 7, 8 are formed so as to have the minimal dimensions determined as above, the laser light beams of the first and second wavelengths can be made to securely pass through the first and second polarizing hologram diffraction gratings 7, 8, respectively.

Further, according to the embodiment, on the first polarizing hologram substrate 4 is formed the beam splitting diffraction grating 6 which splits the incident light into one main beam and two sub beams. By thus forming the beam splitting diffraction grating 6 on the first polarizing hologram substrate 4 on which the first polarizing hologram diffraction grating 7 is formed, it is possible to reduce the number of optical components in the hologram laser unit 1 compared to a case where the beam splitting diffraction grating 6 is independently disposed. Moreover, in a case of using the hologram laser unit 1 that the number of optical components is reduced, for instance, in the optical pickup apparatus 21, it is possible to reduce size and weight of the optical pickup apparatus 21, and it is possible to decrease the cost of manufacture of the optical pickup apparatus 21.

Further, according to the embodiment, the light receiving element 9 receives the laser light beam of the first wavelength emitted from the first semiconductor laser element 51, and the laser light beam of the second wavelength emitted from the second semiconductor laser element 52, in the common light receiving region. Accordingly, a dimension of the light receiving element 9 can be small compared to a case where the light receiving region for receiving the laser light beam of the first wavelength, and the light receiving region for receiving the laser light beam of the second wavelength are separately disposed so as to receive the laser light beams of the first and second wavelengths in the separately disposed light receiving regions. This makes it possible to reduce size and weight of the hologram laser unit 1.

Figure 9:
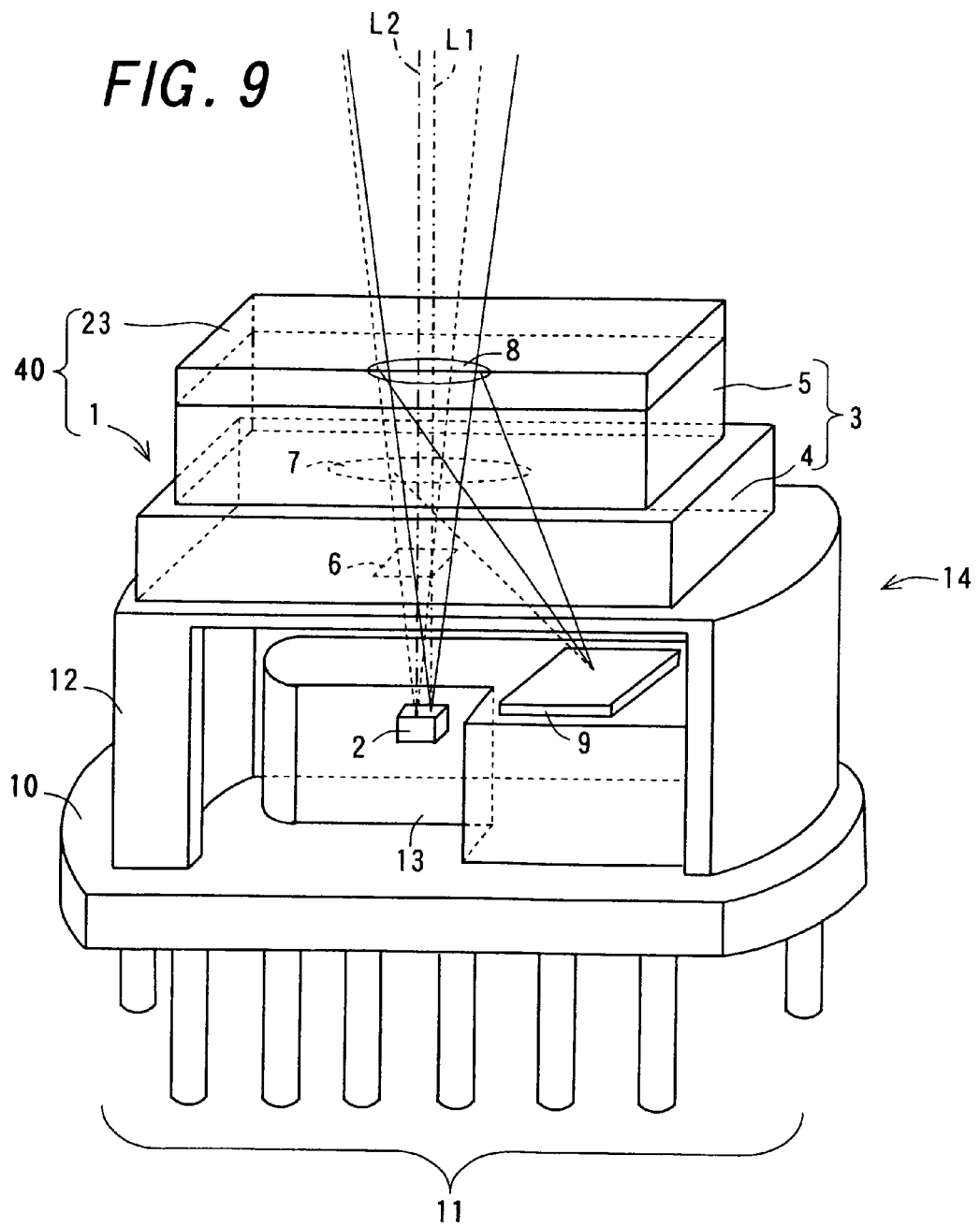
FIG. 9 is a perspective view schematically showing a structure of a hologram laser unit according to a second embodiment of the invention.
Figure 10:
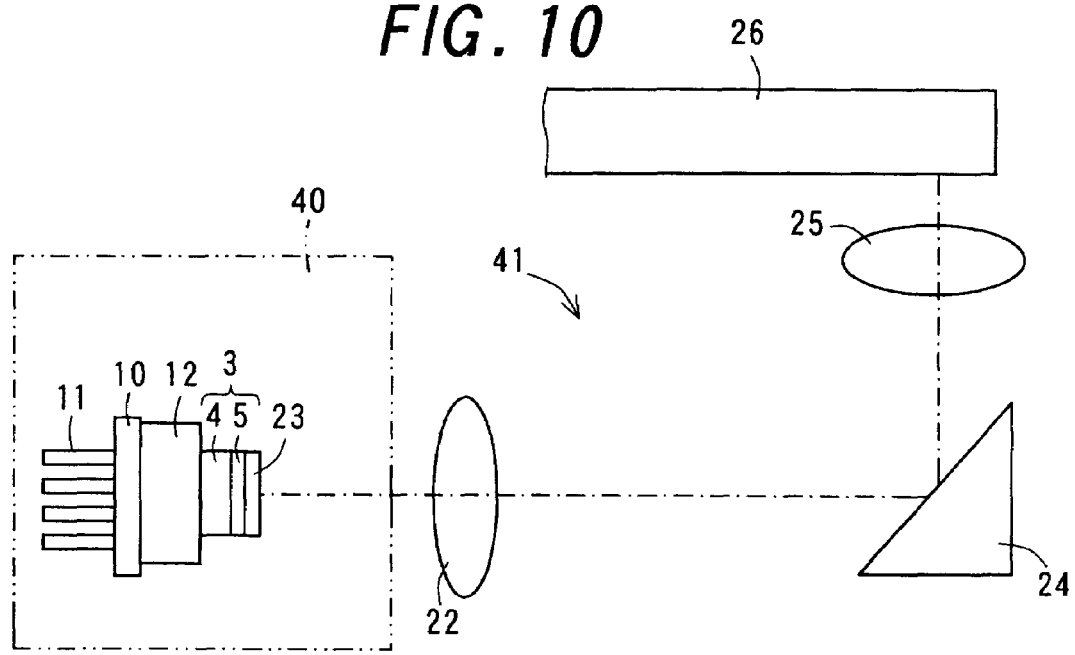
FIG. 10 is a view schematically showing a structure of an optical pickup apparatus.

FIG. 9 is a perspective view schematically showing a structure of a 5λ/4 plate integrated hologram laser unit 40, which is a second embodiment of the invention. FIG. 10 is a view schematically showing a structure of the optical pickup apparatus 41. In FIG. 9, a cap 12 described later is partially cut away to show. Since the 5λ/4 plate integrated hologram laser unit 40 is similar to the hologram laser unit 1 in the optical pickup apparatus 21 described above, and the hologram laser unit 40 has the same structure and function as the hologram laser unit 1 except that the 5λ/4 plate 23 is integrally formed on one surface portion in a thickness direction of the hologram coupled member 3, corresponding portions will be denoted by the same reference numerals, and descriptions of the same structure and function as those of the hologram laser unit 1 will be omitted. The 5λ/4 plate integrated hologram laser unit 40 comprises the hologram laser unit 1 and the 5λ/4 plate 23. The optical pickup apparatus 41 comprises the 5λ/4 plate integrated hologram laser unit 40, the collimation lens 22, the erecting mirror 24, and the objective lens 25. The optical pickup apparatus 41 is an apparatus which executes at least one of processing of optically reading information recorded on the information recording surface of the optical recording medium 26 and processing of optically recording information on the information recording surface of the optical recording medium 26.

Although the 5λ/4 plate 23 is placed on the optical path between the collimation lens 22 and the erecting mirror 24 in the optical pickup apparatus 21 as shown in FIG. 2, the 5λ/4 wavelength plate 23 is integrally structured with the hologram coupled member 3 of the hologram laser unit 1 in the optical pickup apparatus 41 shown in FIG. 10. To describe further, the 5λ/4 plate 23 is mounted and structured on one surface portion in the thickness direction of the second polarizing hologram substrate 5 of the hologram coupled member 3.

According to the embodiment as described above, by integrating the 5λ/4 plate 23 and the hologram coupled member 3 to structure the 5λ/4 plate integrated hologram laser unit 40, the number of optical components and the number of steps in assembly at the time of manufacture are reduced, and an operation of an optical adjustment such as an optical axis adjustment is simplified. Moreover, in the case of using the 5λ/4 plate integrated hologram laser unit 40 that the number of optical components is reduced, in the optical pickup apparatus 41, it is possible to make the length of an optical path between the 5λ/4 plate integrated hologram laser unit 40 and the erecting mirror 24 to be shorter than in the optical pickup apparatus 21 described above, with the result that it is possible to reduce the size of the optical pickup apparatus 41, and it is possible to decrease the cost of manufacture of the optical pickup apparatus 41.

According to the embodiment, the 5λ/4 plate integrated hologram laser unit 40 and the optical pickup apparatus 41 have the same structure as in the first embodiment described above and therefore, the same effect as in the embodiment described above can be obtained.

The aforementioned embodiments merely exemplify the invention, and the structure of the invention may be changed within the scope of the invention. For instance, although the structures of the hologram laser unit 1 and the optical pickup apparatus 21 in a case of using as light sources the first and second semiconductor laser elements 51, 52 emitting a linearly polarized laser light beam which is polarized in the first polarizing direction, are described in the aforementioned embodiments, the invention can also be similarly embodied in a case of using as light sources the first and second semiconductor laser elements 51, 52 emitting a circularly polarized laser light beam in another embodiment of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A hologram laser unit, comprising:
   a light source emitting light beams of a first wavelength and a second wavelength;
   a light receiving element receiving a light beam emitted from the light source and reflected by an information recording surface of an optical recording medium; and a hologram coupled member having a first optical element and a second optical element, the first optical element diffracting an incident light, included in the light beam reflected by the information recording surface, of the first wavelength which is polarized in a first polarization direction, to a direction toward the light receiving element and transmitting an incident light, included in the light beam reflected by the information recording surface, which is polarized in a second polarization direction perpendicular to the first polarization direction, and the second optical element diffracting an incident light, included in the light beam reflected by the information recording surface, of the second wavelength which is polarized in the second polarization direction to a direction toward the light receiving element and transmitting an incident light, included in the light beam reflected by the information recording surface, which is polarized in the first polarization direction.

2. The hologram laser unit of claim 1, wherein the hologram coupled member is structured in a lamination of a first substrate on which the first optical element is formed, and a second substrate on which the second optical element is formed, and surfaces of the first and second substrates which face each other are plane.

3. The hologram laser unit of claim 2, wherein on the first substrate is formed a beam splitting diffraction grating which splits an incident light into one main beam and two sub beams.

4. An optical pickup apparatus comprising:

the hologram laser unit of claim 2 in which the light source emits a light beam polarized in the first polarization direction;

an optical system condensing a light beam emitted from the light source of the hologram laser unit onto an information recording surface of an optical recording medium, and guiding a reflected light to the hologram laser unit; and a polarizing element changing the polarization direction of the light beam of the second wavelength reflected by the information recording surface of the optical recording medium and guided to the hologram laser unit by the optical system, to the second polarization direction, wherein the polarizing element is structured in a single body with the second substrate.

5. The hologram laser unit of claim 1, wherein the light source is an integrated semiconductor laser unit into which a first semiconductor laser element emitting the light beam of the first wavelength and a second semiconductor laser element emitting the light beam of the second wavelength are integrated.

6. The hologram laser unit of claim 1, wherein the first wavelength is 780 nm and the second wavelength is 650 nm.

7. The hologram laser unit of claim 1, wherein the first and second optical elements are formed so that the light beam of the first wavelength passes through the first and second optical elements, and the light beam of the second wavelength passes through the first and second optical elements.

8. The hologram laser unit of claim 7, wherein dimensions of the first and second optical elements are determined based on numerical apertures of lenses which guide the light beam reflected by the optical recording medium to the hologram coupled member.

9. The hologram laser unit of claim 1, wherein the light receiving element receives the light beams of the first and second wavelengths in a common light receiving region.

10. An optical pickup apparatus comprising:

the hologram laser unit of claim 1 in which the light source emits a light beam polarized in the first polarization direction;

an optical system condensing a light beam emitted from the light source of the hologram laser unit onto an information recording surface of an optical recording medium, and guiding a reflected light to the hologram laser unit; and a polarizing element changing the polarization direction of the light beam of the second wavelength reflected by the information recording surface of the optical recording medium and guided to the hologram laser unit by the optical system, to the second polarization direction.

11. A hologram laser unit, comprising:

a light source emitting light beams of a first wavelength and a second wavelength;

a light receiving element receiving a light beam emitted from the light source and reflected by an information recording surface of an optical recording medium; and a hologram coupled member having a first optical element and a second optical element, the first optical element diffracting an incident light of the first wavelength which is polarized in a first polarization direction, to a direction toward the light receiving element and transmitting an incident light which is polarized in a second polarization direction perpendicular to the first polarization direction, and the second optical element diffracting an incident light of the second wavelength which is polarized in the second polarization direction to a direction toward the light receiving element and transmitting an incident light which is polarized in the first polarization direction, wherein the first and second optical elements are formed so that the light beam of the first wavelength passes through the first and second optical elements, and the light beam of the second wavelength passes through the first and second optical elements.

12. The hologram laser unit of claim 11, wherein the hologram coupled member is structured in a lamination of a first substrate on which the first optical element is formed, and a second substrate on which the second optical element is formed, and surfaces of the first and second substrates which face each other are substantially planar.

13. The hologram laser unit of claim 12, wherein on the first substrate is formed a beam splitting diffraction grating which splits an incident light into a main beam and sub beams.

14. An optical pickup apparatus comprising:

the hologram laser unit of claim 12 in which the light source emits a light beam polarized in the first polarization direction;

an optical system condensing a light beam emitted from the light source of the hologram laser unit onto an information recording surface of an optical recording medium, and guiding a reflected light to the hologram laser unit; and a polarizing element changing the polarization direction of the light beam of the second wavelength reflected by the information recording surface of the optical recording medium and guided to the hologram laser unit by the optical system, to the second polarization direction, wherein the polarizing element is structured in a single body with the second substrate.

15. The hologram laser unit of claim 11, wherein the light source is an integrated semiconductor laser unit into which a first semiconductor laser element emitting the light beam of the first wavelength and a second semiconductor laser element emitting the light beam of the second wavelength are integrated.

16. A hologram laser unit of claim 11, wherein the first wavelength is 780 nm and the second wavelength is 650 nm.

17. The hologram laser unit of claim 11, wherein dimensions of the first and second optical elements are determined based on numerical apertures of lenses which guide the light beam reflected by the light recording medium to the hologram coupled member.

18. The hologram laser unit of claim 11, wherein the light receiving element receives the light beams of the first and second wavelengths in a common light receiving region.

19. An optical pickup apparatus comprising:
the hologram laser unit of claim 11 in which the light source emits a light beam polarized in the first polarization direction;
an optical system condensing a light beam emitted from the light source of the hologram laser unit onto an information recording surface of an optical recording medium, and guiding a reflected light to the hologram laser unit; and
a polarizing element changing the polarization direction of the light beam of the second wavelength reflected by the information recording surface of the optical recording medium and guided to the hologram laser unit by the optical system, to the second polarization direction.

20. A hologram laser unit, comprising:
a light source emitting light beams of a first wavelength and a second wavelength;
a light receiving element receiving a light beam emitted from the light source and reflected by an information recording surface of an optical recording medium; and
a hologram coupled member having a first optical element and a second optical element, the first optical element diffracting an incident light of the first wavelength which is polarized in a first polarization direction, to a direction toward the light receiving element and transmitting an incident light which is polarized in a second polarization direction perpendicular to the first polarization direction, and the second optical element diffracting an incident light of the second wavelength which is polarized in the second polarization direction to a direction toward the light receiving element and transmitting an incident light which is polarized in the first polarization direction, wherein the hologram coupled member is structured in a lamination of a first substrate on which the first optical element is formed, and a second substrate on which the second optical element is formed, and surfaces of the first and second substrates which face each other are planar.

* * * * *